United States Patent [19]
Hori et al.

[11] Patent Number: 6,120,080
[45] Date of Patent: Sep. 19, 2000

[54] SPRINGING UP APPARATUS FOR DOOR OF VAN-TYPE TRUCK

[75] Inventors: Masaki Hori, Tokyo; Katsumi Sugimoto, Kanagawa, both of Japan

[73] Assignee: Seiko Giken Kabushiki Kaisha, Tokyo, Japan

[21] Appl. No.: 08/817,424

[22] PCT Filed: Jul. 24, 1996

[86] PCT No.: PCT/JP96/02075

§ 371 Date: Sep. 11, 1997

§ 102(e) Date: Sep. 11, 1997

[87] PCT Pub. No.: WO97/03854

PCT Pub. Date: Feb. 6, 1997

[30] Foreign Application Priority Data

Jul. 24, 1995 [JP] Japan .................................. 7-208404
Oct. 25, 1995 [JP] Japan .................................. 7-300697

[51] Int. Cl.[7] .............................. B60J 5/10; B62D 33/04
[52] U.S. Cl. .................. 296/56; 296/146.12; 49/345; 49/386
[58] Field of Search .................. 296/50, 56, 146.1, 296/146.11, 146.12; 49/386, 345, 197, 199, 200, 203, 204, 205, 206; 292/262, DIG. 19

[56] References Cited

U.S. PATENT DOCUMENTS

| | | | |
|---|---|---|---|
| 2,162,381 | 6/1939 | Guth | 49/205 X |
| 2,220,766 | 11/1940 | Hubbs | 49/386 X |
| 2,711,343 | 6/1955 | Falk et al. | 296/56 X |
| 3,770,314 | 11/1973 | Borskey | 296/176 |
| 3,837,701 | 9/1974 | Curtis et al. | 296/167 |
| 3,922,816 | 12/1975 | Hormann | 49/206 X |

FOREIGN PATENT DOCUMENTS

| | | | |
|---|---|---|---|
| 1209021 | 1/1966 | Germany | 49/206 |
| 49-53417 | 5/1974 | Japan . | |
| 54-12671 | 1/1979 | Japan . | |
| 60-161278 | 10/1985 | Japan . | |
| 3-281882 | 12/1991 | Japan . | |
| 7-10348 | 2/1995 | Japan . | |

*Primary Examiner*—D. Glenn Dayoan
*Assistant Examiner*—Chad D. Wells
*Attorney, Agent, or Firm*—Morrison & Forester LLP

[57] ABSTRACT

A springing up apparatus for the door (especially the rear door of a cargo box) of a van-type truck is constructed by pivotally attaching the second end of an arm A having a first end pivotally attached to a cargo box body and a second end of an arm B having a first end pivotally attached to the door of the cargo box, and loading a tension spring between a prescribed point on the arm B and a prescribed point on the cargo box body or on the door of the cargo box. This makes it easy to open and close the door of the cargo box by human power. Further, use is made of a compression spring, which is provided on the roof of the cargo box, and there are additionally provided a spring cover mounting structure, which is capable of rotating about a horizontal shaft fixed to the roof, as well as a door-opening adjustment mechanism, which comprises a bracket and an adjustment disk, for adjusting initial amount of compression of the compression spring. This makes it easy to bring the door to rest at a desired position.

12 Claims, 18 Drawing Sheets

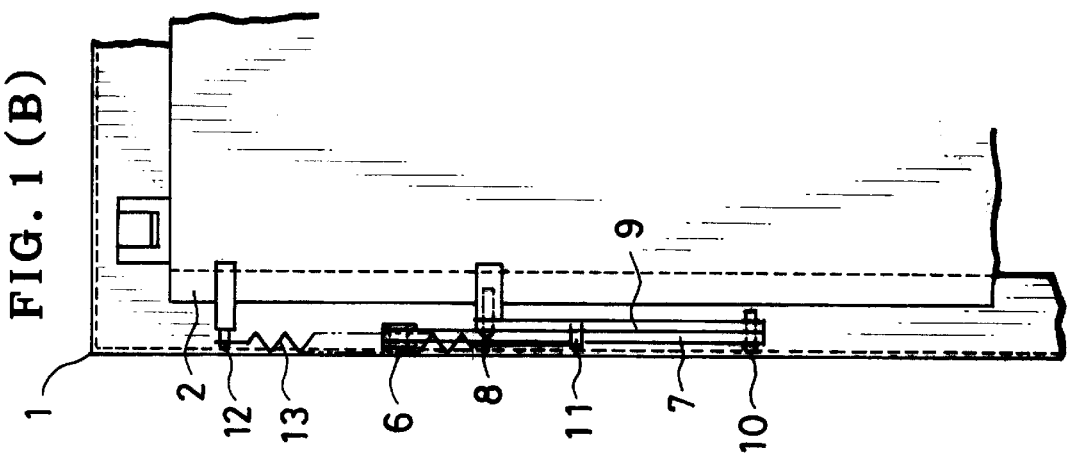
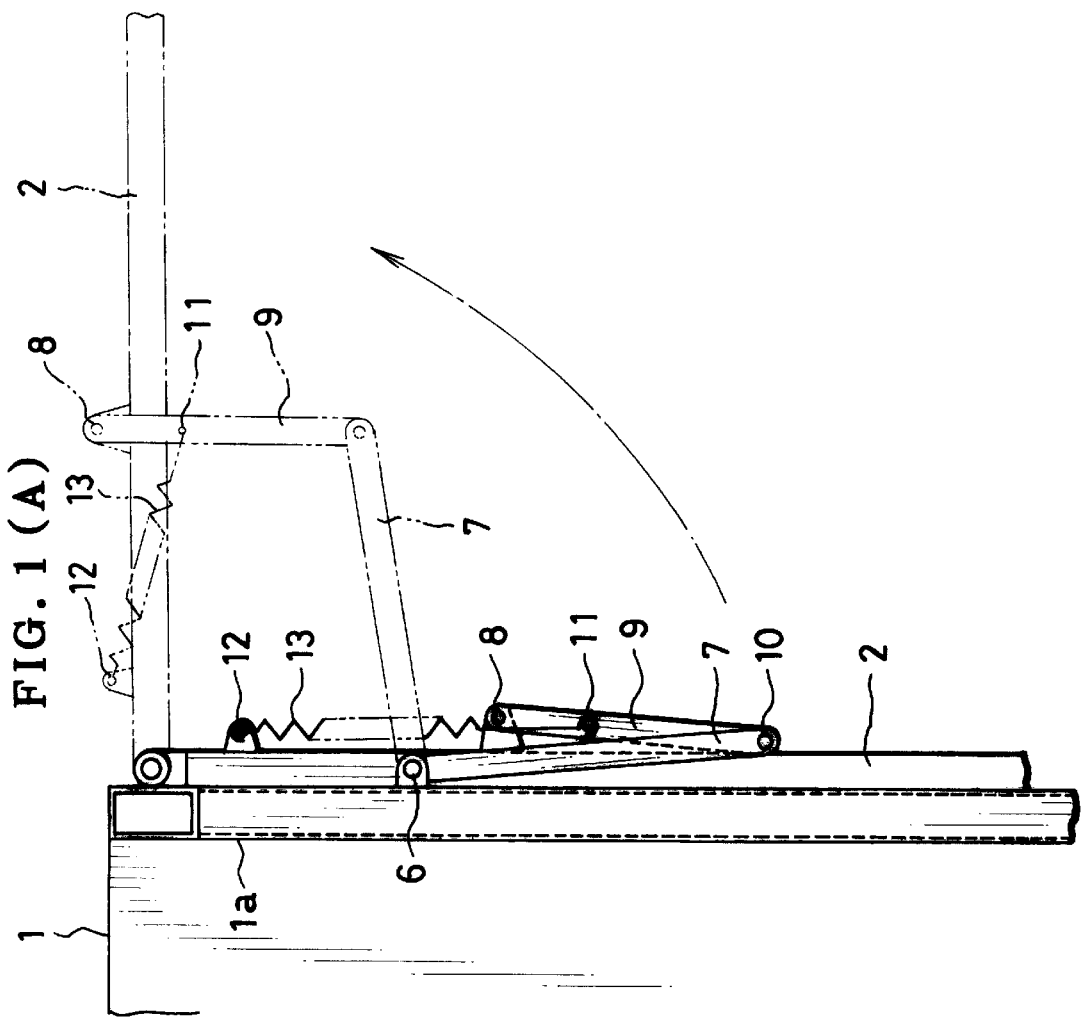

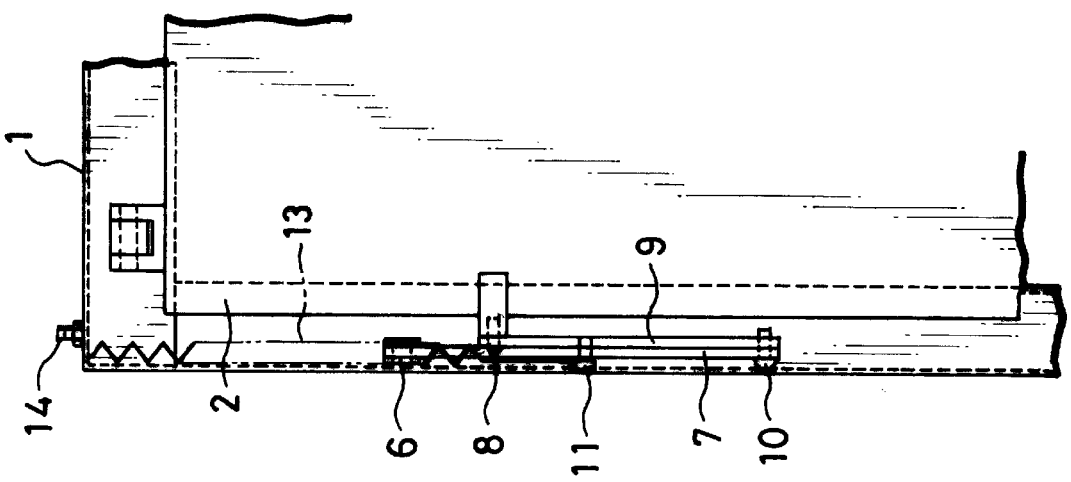
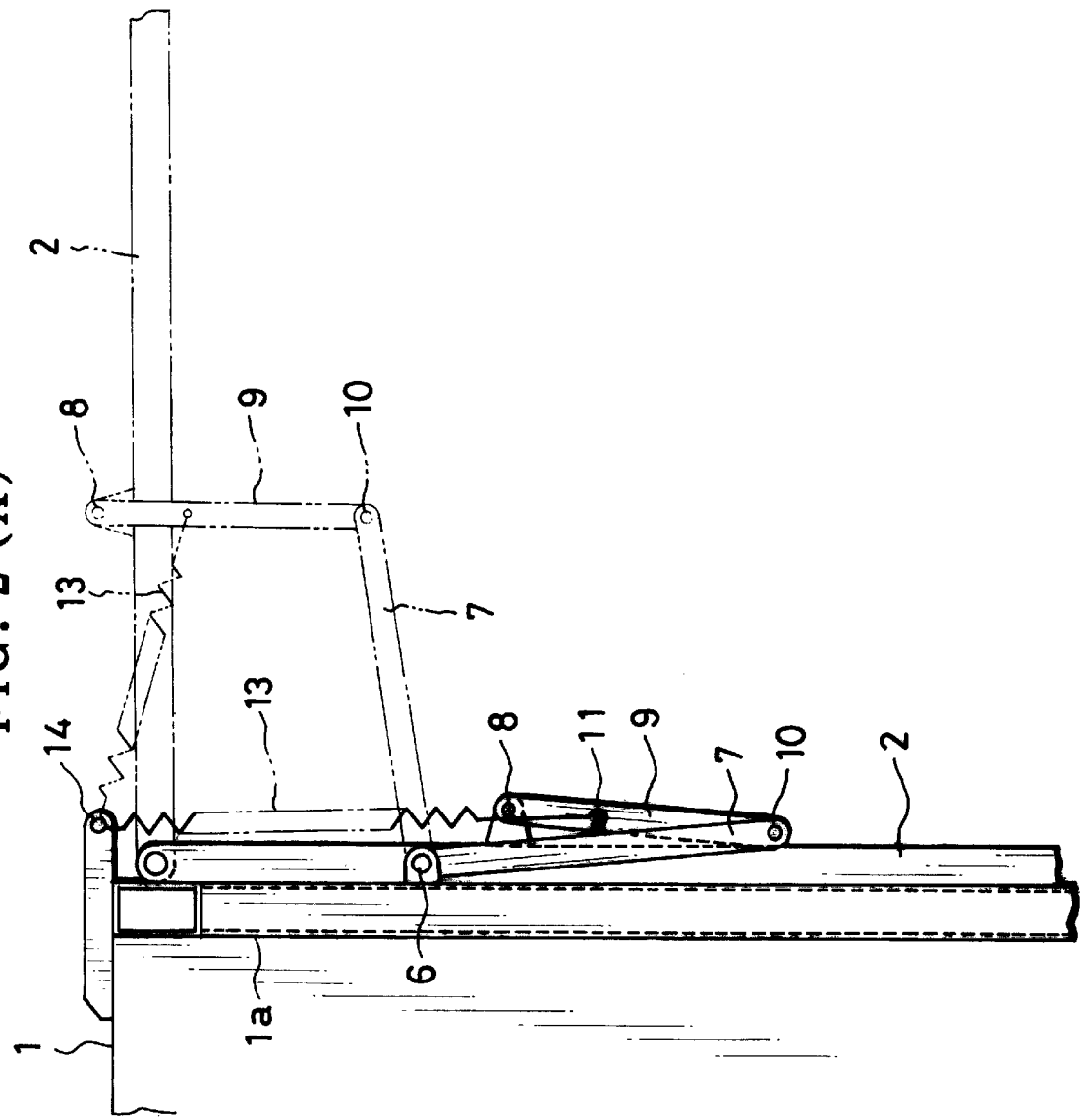

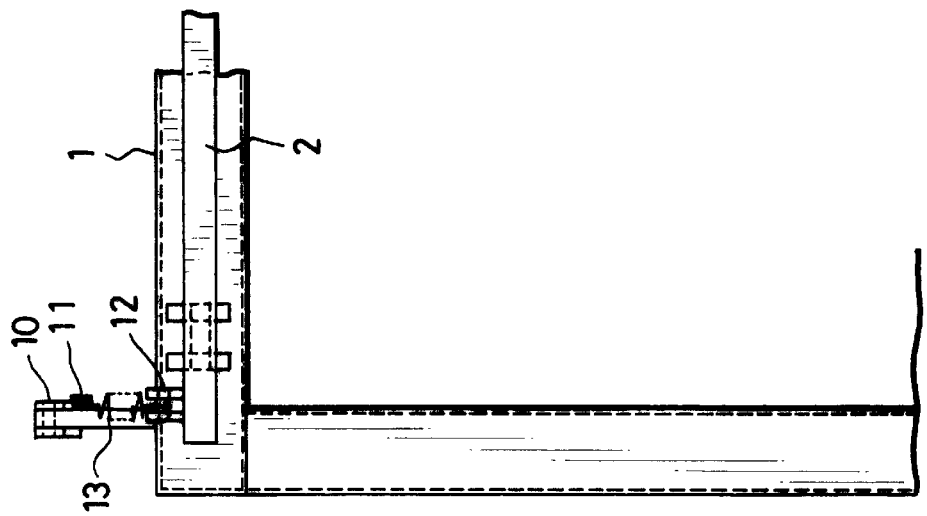
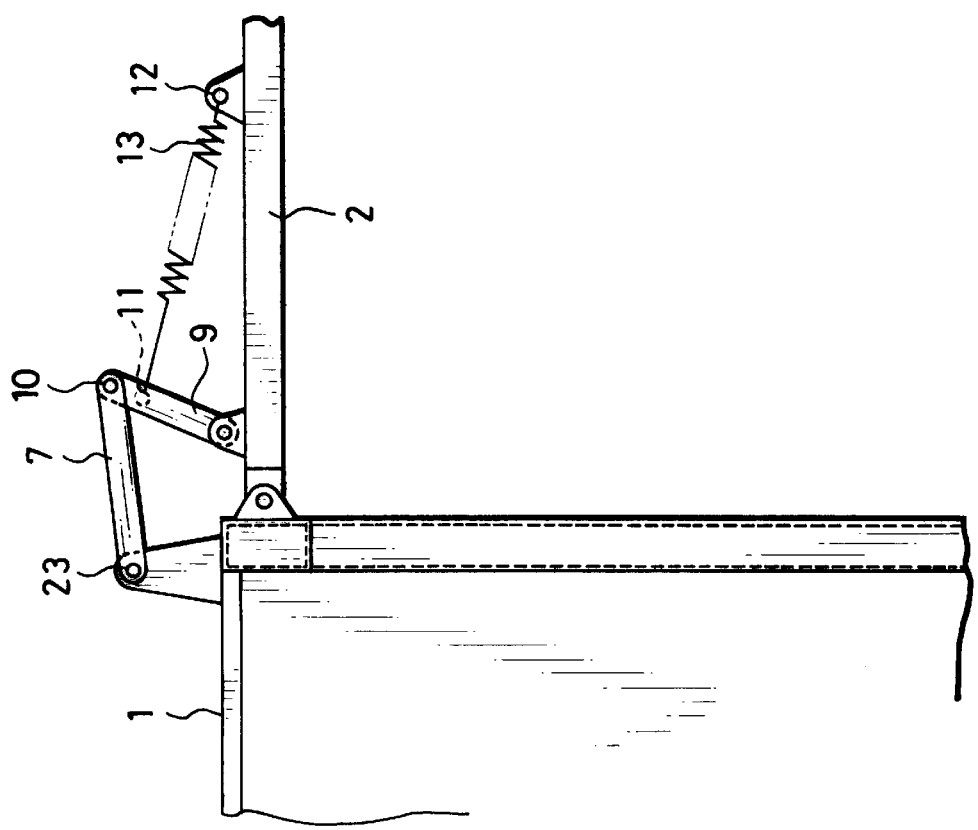

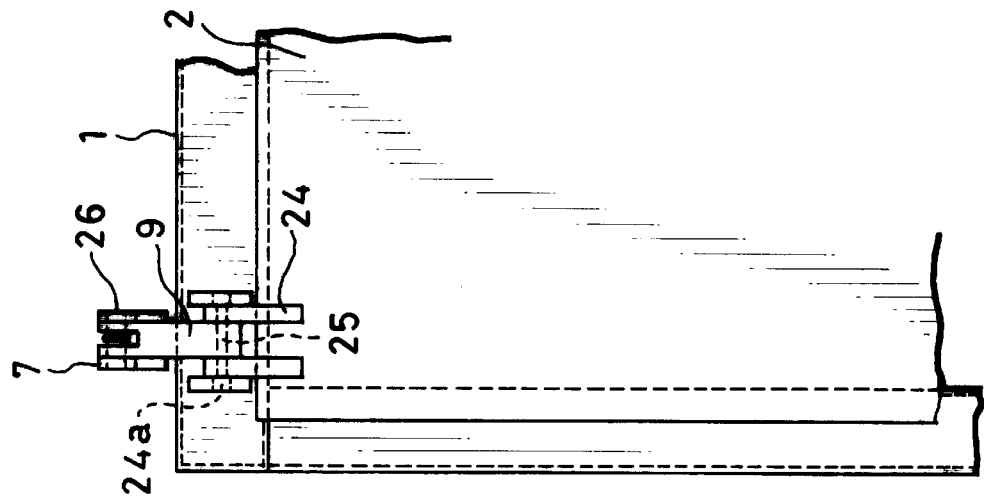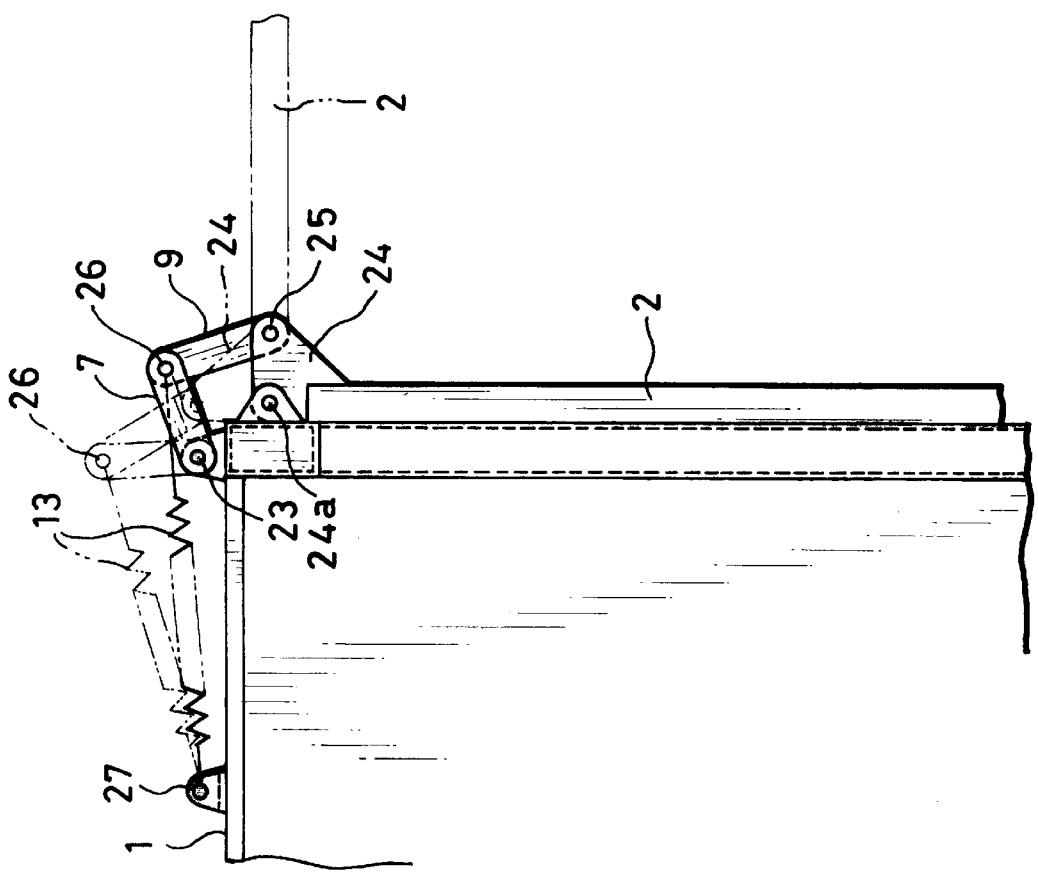

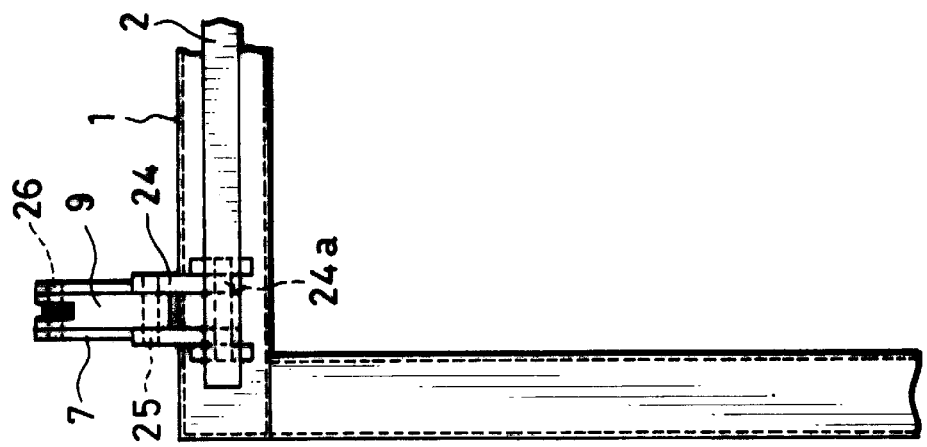
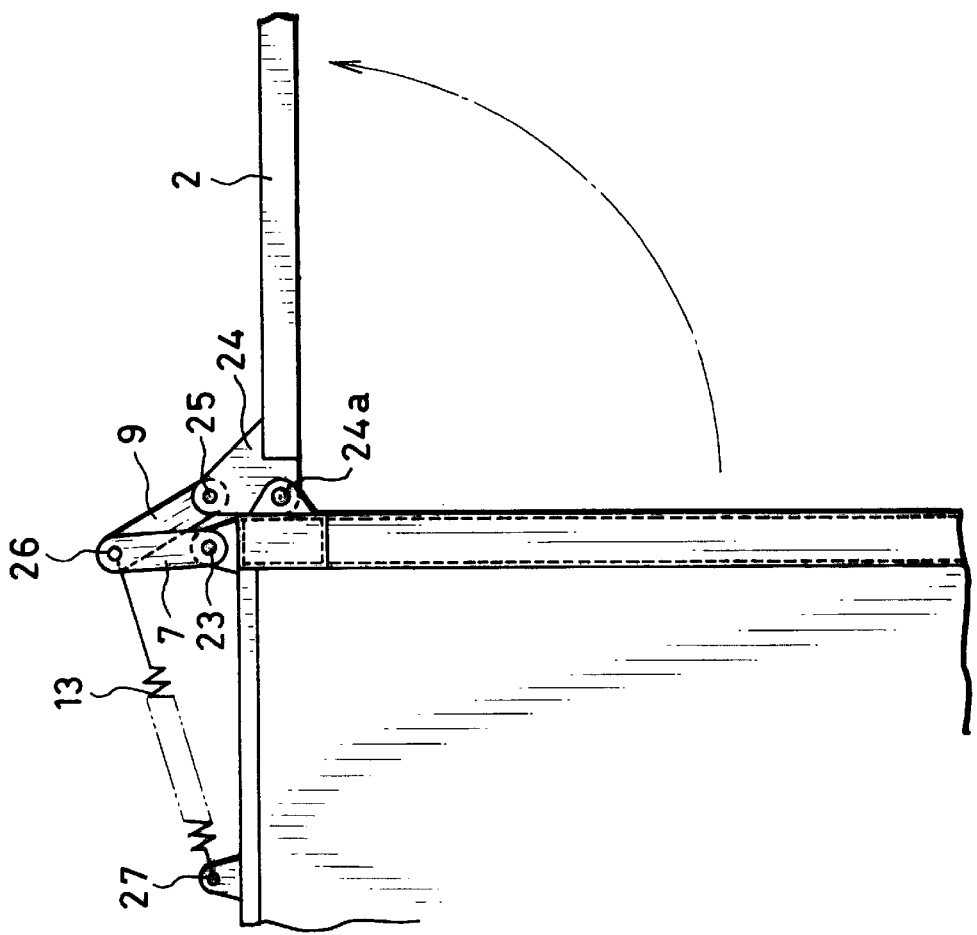

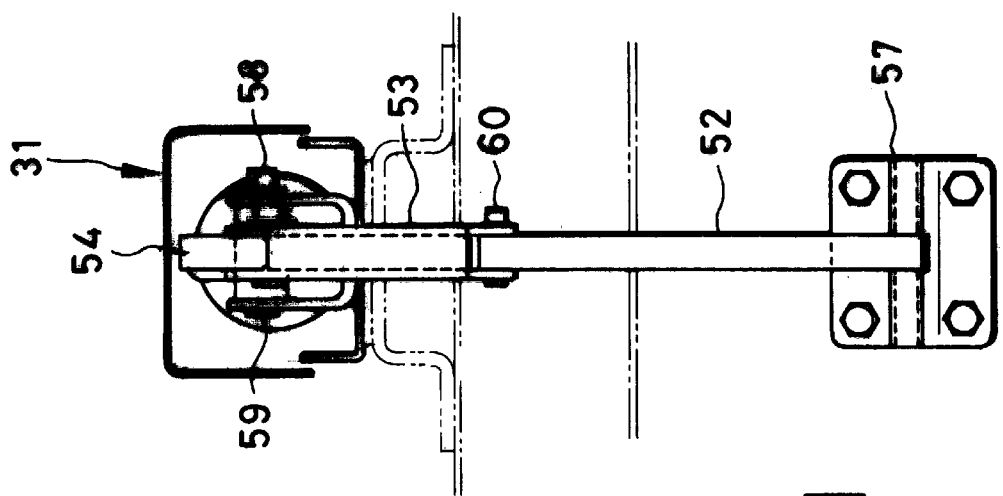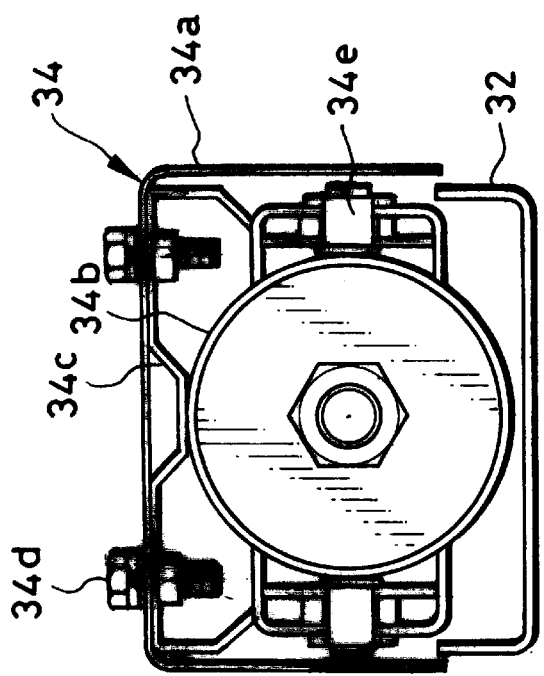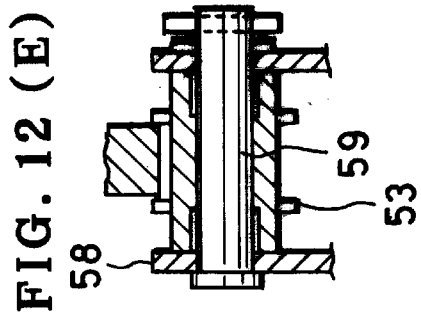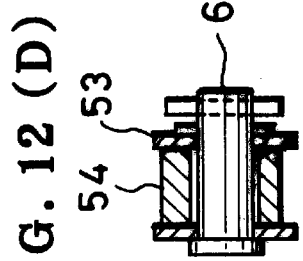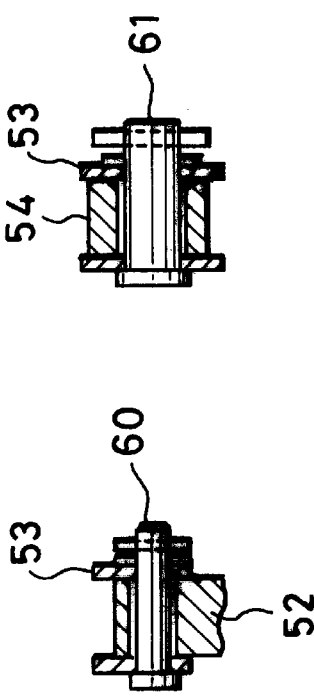

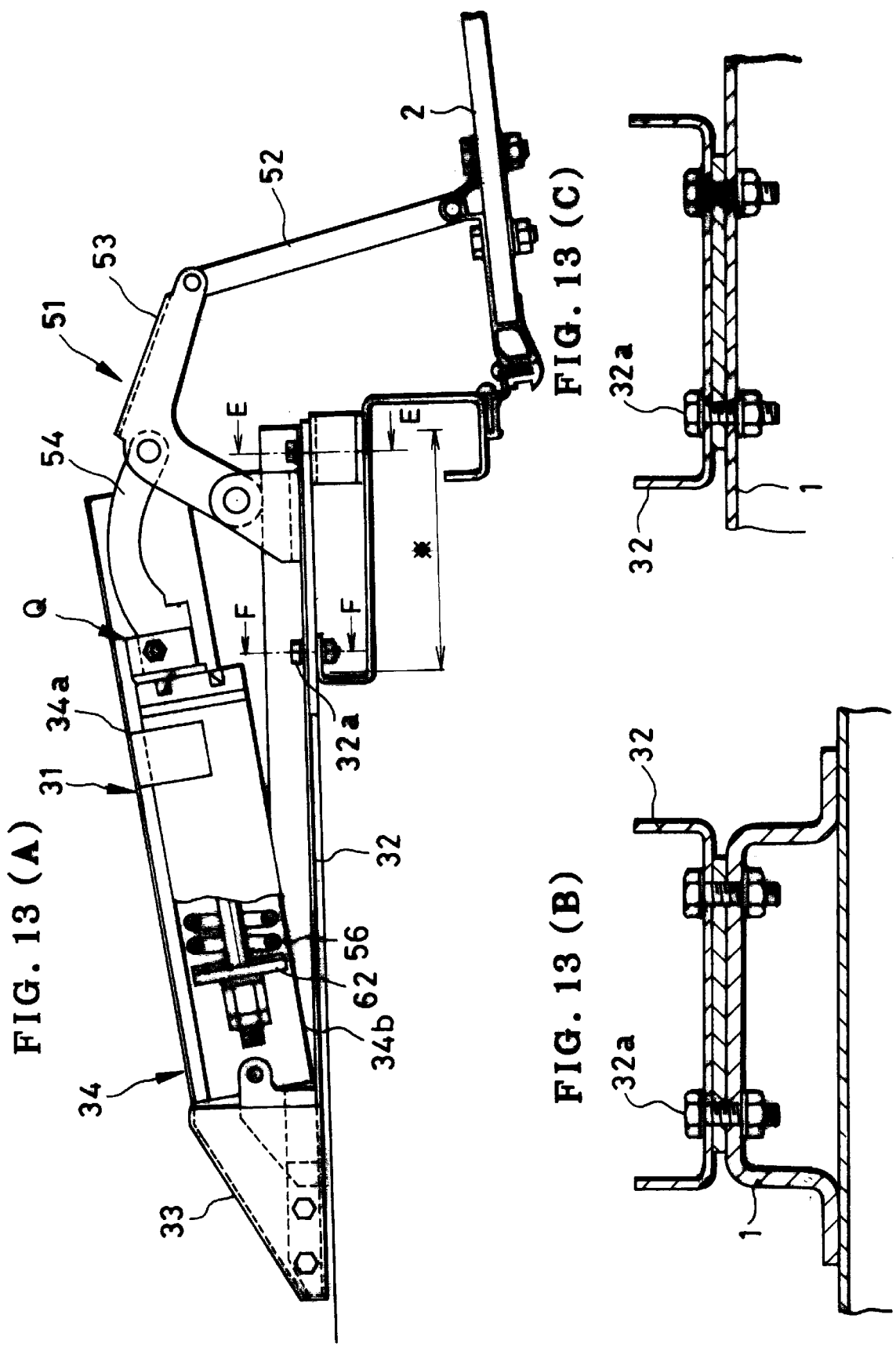

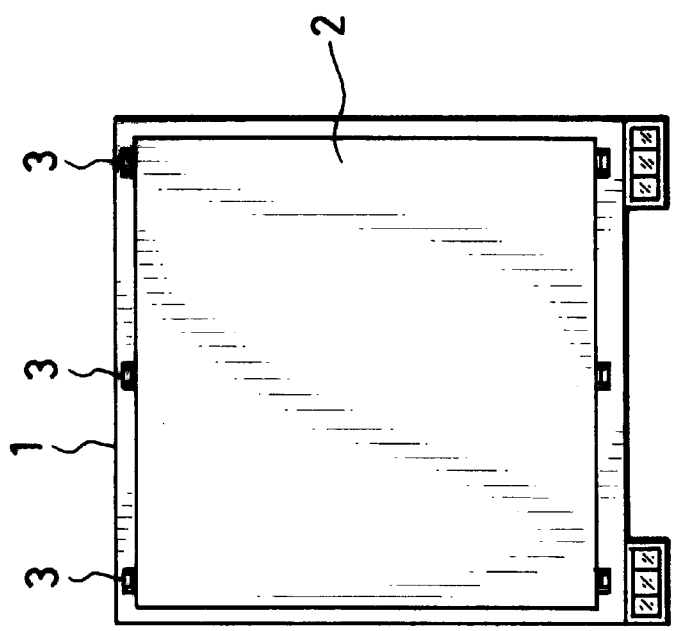
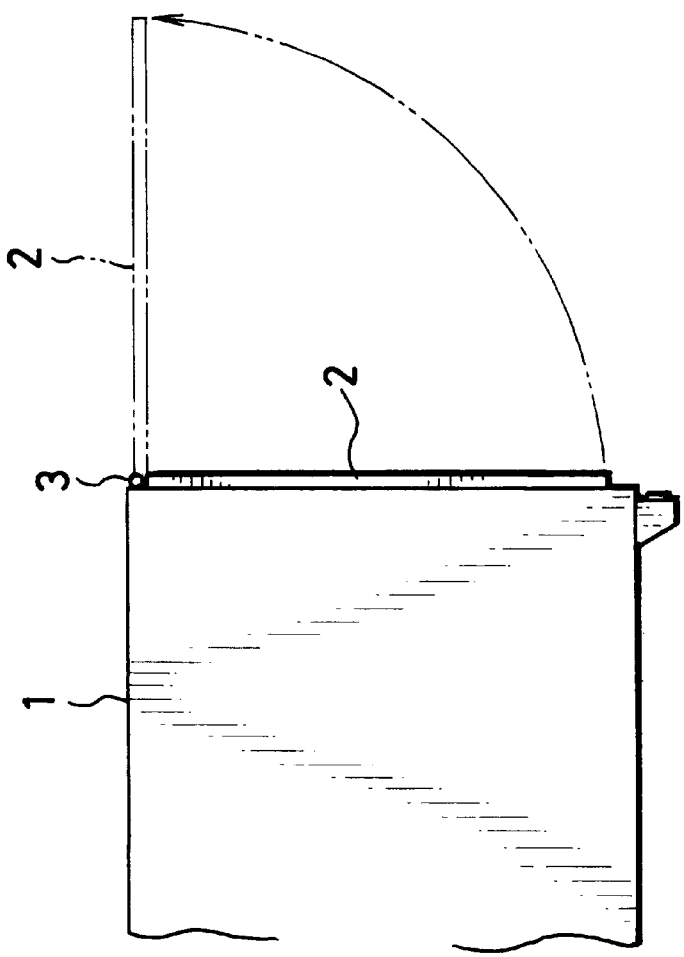
FIG. 17 (A)
FIG. 17 (B)

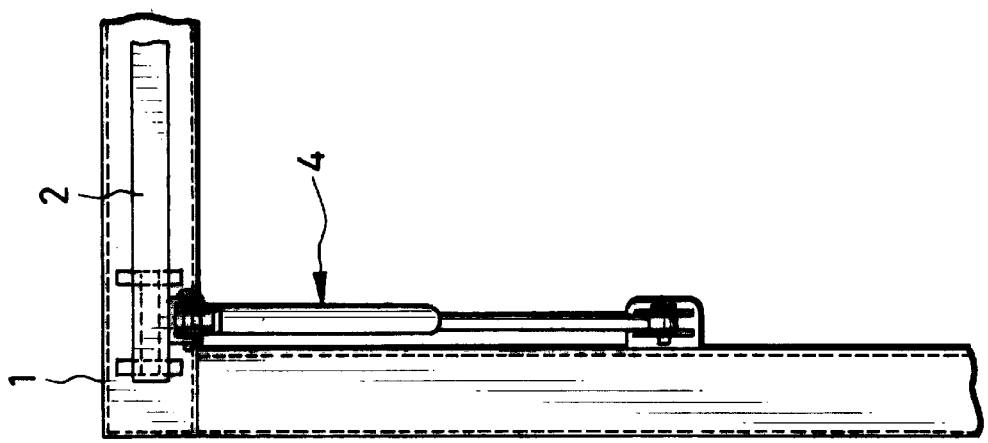
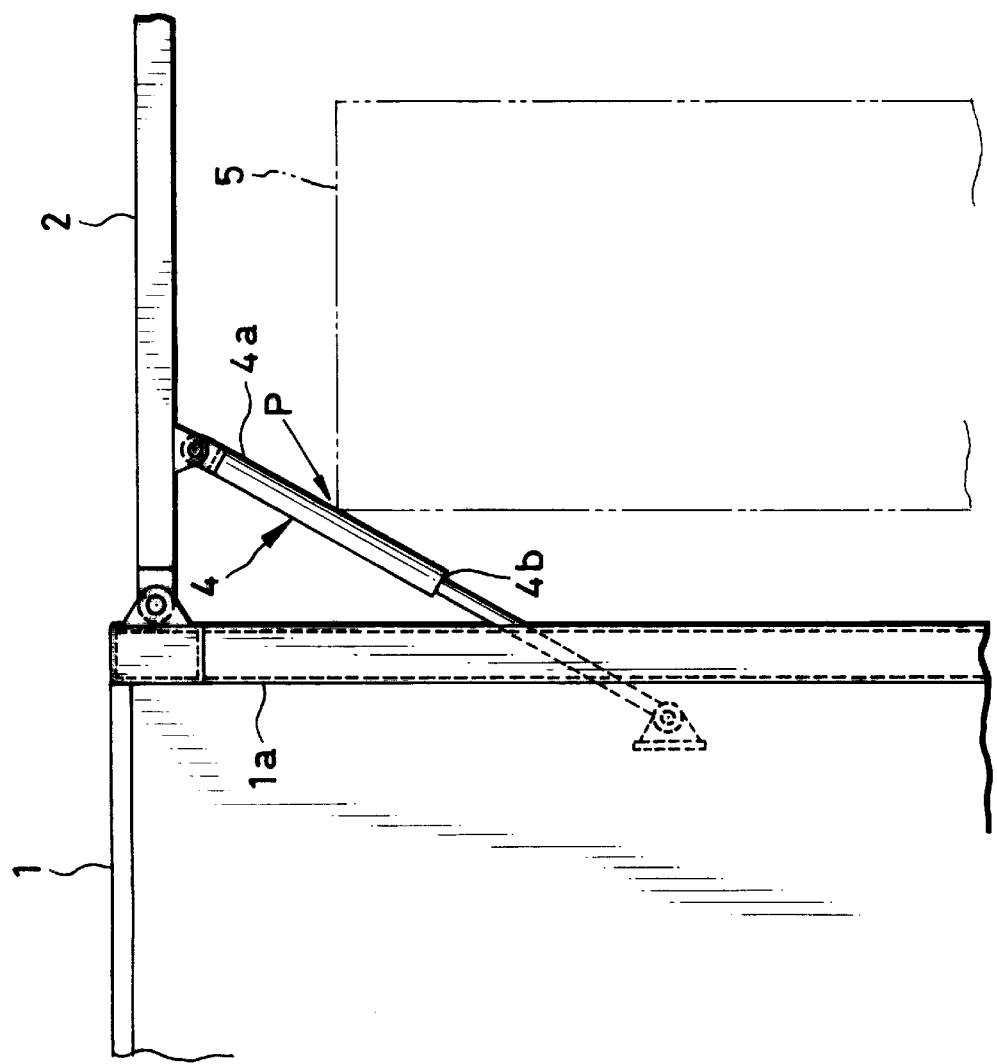
FIG. 18 (A)
FIG. 18 (B)

SPRINGING UP APPARATUS FOR DOOR OF VAN-TYPE TRUCK

TECHNICAL FIELD

This invention relates to a springing up (suspension) apparatus for the door (especially the rear door of a cargo box) of a van-type truck. More particularly, the invention relates to a suspension apparatus for the rear door of a van-type truck for the purpose of facilitating the opening and closing of a so-called suspended-type rear door, the door being the rear door of the cargo box of a van-type truck of the type in which a cargo box (in the shape of a rectangular parallelepiped, for example) is formed on a truck bed, wherein the door is opened and closed by rotating the door using the upper side (a horizontal axis) of the rear of the container as the axis of rotation,

BACKGROUND ART

Trucks include so-called van-type trucks which, as shown in FIG. 15, have a cargo box 1 of the sealed kind for the purpose of protecting cargo from rain, wind and dust and to prevent loss and theft of the cargo. However, in order to load and unload cargo, it goes without saying that a large opening is required.

Conventionally, a rear door of the kind shown in FIGS. 16, 17 [in both of which (A) is a side view and (B) a front view] is used for this purpose. More specifically, in FIG. 16, a rear door 2 of the cargo box 1 is composed of an upper door 2a and a lower 2b that are separate of each other. The upper door 2a is opened and closed by being rotated about an upper shaft 3a, and the lower door 3b is opened and closed by being rotated about a lower shaft 3b.

In FIG. 17, a rear door 2 constitutes a single body and is opened and closed by being rotated about a shaft 3.

In the view of the inventor, however, a rear door of this conventional type is disadvantageous in that a large moment is produced about the shaft, owing to the door's own weight, during the operation for opening and closing the rear door, thus making it difficult for a large-size door to be opened and closed by human power.

A rear door suspension apparatus of the kind shown in FIG. 18 [in which (A) is a front view and (B) a side view] has been proposed heretofore. In this case an air damper 4 is fitted between the rear door 2 and a cargo box body 1a in the manner illustrated. A gas such as compressed air is sealed within a cylinder 4a of the air damper 4. The moment produced by the door's own weight during the opening-and-closing operation is supported by the pressure of the gas, thus making it easy to open and close the door by human power.

In the view of the inventor, however, a drawback in the case of this proposed apparatus is that a sealing portion 4b of the cylinder sustains wear and allows the interior gas to leak out when the door is opened and closed frequently. Further, if cargo 5 is large in size, the air damper 4 can be damaged by the cargo, as indicated at arrow P, when the cargo is handled, and this can lead to leakage of the gas.

DISCLOSURE OF THE INVENTION

Accordingly, an object of the present invention is to solve the aforementioned drawbacks of the rear door of a van-type truck and provide a springing up (suspension) apparatus for the door (especially the rear door of the cargo box) of a van-type truck which makes it possible to open and close even a large door easily by human power, wherein the apparatus will not readily be damaged even by cargo of large size.

Another object is to provide a suspension apparatus for the door (especially the rear door of the cargo box) of a van-type truck, in which the door can be opened and brought to rest at a desired position.

Other objects will become apparent from the overall description of this application.

The present invention is based on the fact that when a second end of a first arm having a first end pivotally attached to a cargo box body and a second end of a second arm having a first end pivotally attached to a door (especially a rear door of the cargo box) are pivotally attached to each other, any point on the second arm will move relative to both the cargo box body and the door as the door is opened and closed, and the invention is characterized in that a spring is loaded between the cargo box and the door.

In order to attain the foregoing objects, a first aspect of the present invention is characterized by the following:

(1)
 (a) an arm A having one end pivotally attached to a cargo box body via a pin;
 (b) an arm B having a first portion pivotally attached to a door of the cargo box via a pin, and a second portion pivotally attached to another end of the arm A via a pin; and
 (c) a tension spring loaded between a pin fixed to the door and a pin fixed to a third portion of the arm B.

The apparatus according to this first aspect can be practiced ideally through an embodiment illustrated in FIG. 1 or FIG. 3, described later.

The objects of the invention can be attained effectively even if different arrangements, of the kind illustrated in (2) and (3) below, are adopted for the above-mentioned arm A, arm B and tension spring.

In regard to a second aspect, the invention is characterized by the following:

(2)
 (a) an arm A having one end pivotally attached to a cargo box body via a pin;
 (b) an arm B having a first portion pivotally attached to the door (especially the rear door of a cargo box) via a pin, and a second portion pivotally attached to another end of the arm A via a pin; and
 (c) a tension spring loaded between a pin fixed to the cargo box body and a pin fixed to third portion of the arm B.

The apparatus according to this second aspect can be practiced ideally through an embodiment illustrated in FIG. 2, described later.

In regard to a third aspect, the invention is characterized by the following:

(3)
 (a) an arm A having one end pivotally attached to a cargo box body via a pin;
 (b) an arm B having a first portion pivotally attached to the door (especially the rear door of a cargo box) via a pin, and a second portion pivotally attached to another end of the arm A; and
 (c) a compression spring loaded between a member fixed to the door and a pin, which is fixed to a third portion of the arm B, via a shaft and a spring retainer.

The apparatus according to this third aspect can be practiced ideally through an embodiment illustrated in FIG. 4, described later.

In accordance with the first through third aspects, there is provided a springing up (suspension) apparatus for the door (especially the rear door of a cargo box) of a van-type truck in which a second end of a first arm having a first end pivotally attached to a cargo box body and a second end of a second arm having a first end pivotally attached to the door of the cargo box are pivotally attached to each other, and a tension spring is loaded between a prescribed point on the arm B and a prescribed point on the cargo box body or cargo box door, whereby the cargo box door can be opened and closed easily by human power, with there being no danger that the parts constituting the apparatus will be damaged even when cargo of large size is handled. The apparatus relating to the first through third aspects illustrated in (1) through (3) above can take on different forms, indicated in (4) through (10) below, in regard to embodiments thereof.

(4) In aspects (1) and (2) above, the first portion of the arm can be one end thereof, the second portion can be the other end thereof and the third portion can be an intermediate portion thereof (see FIG. 1 or FIG. 2 as a preferred embodiment).

(5) In aspects (1) and (3) above, the first portion of the arm B can be an intermediate portion thereof, the second portion can be one end thereof and the third portion can be the other end thereof (see FIG. 3 as a preferred embodiment).

(6) In aspect (1), it can be so arranged that one end of the arm A is pivotally attached to an end portion in the proximity of a door (especially the rear door of a cargo box) on the upper side of the cargo box, the first portion of the arm B is one end thereof and is pivotally attached to an outer side of the door via a pin, the second portion is the other end thereof and is pivotally attached to the other end of the arm A via a pin, the third portion is an intermediate portion thereof, and the tension spring is secured to the third portion (see FIGS. 5 and 6 as a preferred embodiment).

(7) In aspect (2), it can be so arranged that one end of the arm A is pivotally attached to an end portion in the proximity of a door (especially the rear door of a cargo box) on the upper side of the cargo box, the first portion of the arm B is one end thereof and is pivotally attached to the uppermost portion of the door on the outer side thereof via a pin, the second portion is the other end thereof and is pivotally attached to the other end of the arm A via a pin, the third portion is the same as the second portion thereof, and the tension spring is loaded between the pivotally attached pin of the second portion and a pin secured to the upper side of the cargo box (see FIG. 7 as a preferred embodiment).

(8) The embodiment illustrated in (7) above can be so adapted that the arm B is pivotally attached to the upper side of the cargo box via a shaft and is pivotally attached to a member fixed to the door (especially the rear door of the cargo box) via a pin (see FIGS. 7 and 8 as a preferred embodiment).

(9) The embodiment illustrated in (6) and (7) above can be so adapted that the upper side of the main body of the cargo box is provided with a cover for protecting the arm A or the tension spring and the arm A (see FIG. 9 as a preferred embodiment).

(10) In aspects (1) and (2), it can be so arranged that the tension spring is provided with a turnbuckle for adjusting tension. (See FIG. 10 as a preferred embodiment.)

If the above-described arrangement and the forms of practicing the invention are adopted, the moment produced by the dead load of the door (especially the rear door of a cargo box) at all degrees of opening of the door can be supported substantially accurately by the force of the spring by appropriately selecting the two points between which the spring is loaded, thus making it easy to open and close the door by human power. The door can be operated easily and will not be damaged even when the cargo handled is large in size.

In a fourth aspect of the present invention, the door springing up (suspension apparatus relating to the first aspect from the following viewpoints:

(I) The position at which the spring is loaded is made the roof, which does not interfere with activities.

(II) The spring is protected by being provided with a cover.

(III) A compression spring is used upon taking cost, weight and maintenance, etc., into account.

(IV) As the door is opened and closed, the direction of the force acting upon the compression spring changes. This is accompanied by a displacement in the axis of the compression spring, thereby preventing an excessive force from acting upon the spring.

More specifically, in regard to a fourth aspect, the invention is characterized by the following:

A suspension apparatus for the door of a van-type truck comprising the following elements (a) through (e):

(a) an arm A having one end pivotally attached to an outer side of a door (especially the rear door of a cargo box);

(b) an arm B having one end pivotally attached to a roof of the cargo box via a pin, and another end pivotally attached to the other end of the arm A via a pin;

(c) a rod having one end pivotally attached to an intermediate portion of the arm B via a pin;

(d) a shaft having one end attached to the other end of the rod, and another end to which a spring retainer is attached; and (e) a compression spring loaded between the spring retainer and a member attached to the roof of the cargo box.

The foregoing objects are attained by providing the shaft mounting portion of the rod, namely the other end thereof, with a door-opening adjustment mechanism comprising the following elements (f)–(g), and by providing a spring cover mounting structure, which comprises the following elements (h)–(j), as the member attached to the roof:

(f) a bracket comprising a plate having an L-shaped cross section, the plate having one face provided with an elongated hole and another face formed to have an adjustment finger, the bracket being secured to the rod by a bolt passed through the elongated hole and a hole provided in the rod;

(g) an adjustment disk having a disk-shaped configuration, one side of the disk having a shock absorber attached thereto, another side of the disk being provided with a plurality of grooves engaged by the adjustment finger of the bracket, and a central portion of the disk being provided with female threads with which the one end of the shaft is threadedly engaged;

(h) a base plate secured to the roof of the cargo box;

(i) a fixture secured to the base plate; and (j) a cover assembly comprising a channel-shaped main-body cover and a cylindrically-shaped spring cover integrally attached to the interior of the main-body cover from one end thereof to a point in the proximity of the central portion, the other end of the shaft being inserted into the spring cover, one end portion of the spring cover being pivotally attached to the fixture via a horizontally provided pin, a spring retainer being attached to the other end and the door-opening adjustment mechanism being housed inside the main-body cover at the other end portion thereof.

If this arrangement is adopted, the door (especially the rear door of a cargo box) of a van-type truck can be opened and closed with ease by human power even if the door is large in size. In addition, damage is not readily sustained even by cargo of large size. If the degree of opening is adjusted, it is possible for the rear door to be brought to rest at a desired position. Furthermore, since the main body of the member comprising the main-body cover and the spring cover is capable of rotating about a pin secured horizontally to the roof, the axial center of the compression spring and the direction in which compressive force is applied coincide. As a result, excessive forces are not applied.

More specifically, in accordance with the fourth aspect, the following outstanding effects are provided by attaching the spring mounting structure and the door-opening adjustment mechanism to the suspension apparatus for the door of the van-type truck:

(I) The door (especially the rear door of a cargo box) can be stopped at a prescribed position.

(II) An excessive force does not act upon the compression spring.

(III) The springs and the like are situated on the roof of the cargo box and therefore do not interfere with work.

(IV) Leakage of rain from the roof can be prevented.

The apparatus according to this fourth aspect can be practiced ideally through an embodiment illustrated in FIGS. 11~14, described later.

In regard to a fifth aspect, the invention is characterized by the following:

In a van-type truck having a door (especially the rear door of a cargo box) opened and closed by being rotated about a horizontal axis, a springing up (suspension) apparatus for the door of the van-type truck, characterized by comprising the following elements (a) through (e):

(a) an arm A having one end pivotally attached to an outer side of the door (especially the rear door of a cargo box), the arm A being capable of turning relative to the door as the door (especially the rear door of a cargo box) is opened and closed;

(b) an arm B having one end pivotally attached to a roof of the cargo box, and another end pivotally attached to the other end of the arm A, the arm B being capable of turning relative to the roof of the cargo box in dependence upon turning of the arm A;

(c) a rod having one end pivotally attached to an intermediate portion of the arm B via a pin, the rod being capable of turning relative to the arm B and the roof of the cargo box in dependence upon turning of the arm B;

(d) a shaft having one end attached to the other end of the rod, and another end to which a spring retainer is attached, the shaft being movable axially and being capable of turning relative to the roof of the cargo box in dependence upon turning of the rod; and (e) a compression spring loaded, substantially in concentric relation to the shaft, between the spring retainer and a member attached to the roof of the cargo box;

wherein a door-opening adjusting mechanism is further provided between the rod and the shaft;

(f) the mechanism being attached to the shaft so as to be movable axially of the shaft by being operated and having on one side an engagement portion which engages the rod and on the other side a surface which limits stroke of the shaft in the axial direction thereof, amounts of turning of the rod engaged with the shaft, of the arm B and of the arm A being limited by limiting the stroke of the shaft, whereby degree of opening of the rear door is limited so that the rear door is capable of being stopped at any degree of opening;

the member attached to the roof comprising the following element (g):

(g) the member attached to the roof being a cover for receiving the shaft and the compression spring, one side of the compression spring being secured substantially in concentric relation to the shaft, the cover being pivotally attached to the roof side and being capable of turning in dependence upon turning of the rod, the cover turning in unison with the compression spring in dependence upon turning of the rod while the concentric relationship between the shaft and the compression spring is maintained;

wherein, by virtue of the elements (a)–(g), moment due to empty weight of the door and caused by rotation of the door of the van-type truck opened and closed by rotation about a horizontal axis is supported by the compression spring, which expands and contracts in operative association with rotation of the door, thereby making it possible to stop the door at a desired degree of opening.

In accordance with the apparatus relating to the fifth aspect, actions and effects similar to those of the apparatus relating to the fourth aspect are obtained. This apparatus can be practiced ideally through an embodiment illustrated in FIGS. 11–14, described later.

BRIEF DESCRIPTION OF THE DRAWINGS

FIG. 1 illustrates a first embodiment of the present invention, in which (A) is a side view and (B) a front view;

FIG. 2 illustrates a first embodiment of the present invention, in which (A) is a front view and (B) a side view;

FIG. 6 illustrates a rear door in the opened state in the fifth embodiment of the present invention, in which (A) is a side view and (B) a front view;

FIG. 7 illustrates a sixth embodiment of the present invention, in which (A) is a side view and (B) a front view;

FIG. 8 illustrates a rear door in the opened state in the sixth embodiment of the present invention, in which (A) is a side view and (B) a front view;

FIG. 12 illustrates a ninth embodiment of the present invention, in which (A) is a right side view of FIG. 11, (B) an enlarged view taken along a cross section D—D in FIG. 11, (C) an enlarged view taken along a cross section A—A in FIG. 11, (D) an enlarged view taken along a cross section B—B in FIG. 11 and (E) an enlarged view taken along a cross section C—C in FIG. 11;

FIG. 13 illustrates the ninth embodiment of the present invention, in which (A) is a diagram showing a rear door held suspended at approximately 90], (B) an enlarged view taken along a cross section E—E in (A), and (C) an enlarged view taken along a cross section F—F in (A);

FIG. 17 illustrates another example of the rear door of a van-type truck, in which (A) is a side view and (B) a front view; and FIG. 18 illustrates a suspension apparatus for the rear door of a van-type truck proposed heretofore.

DETAILED DESCRIPTION OF THE INVENTION

Figure 3:
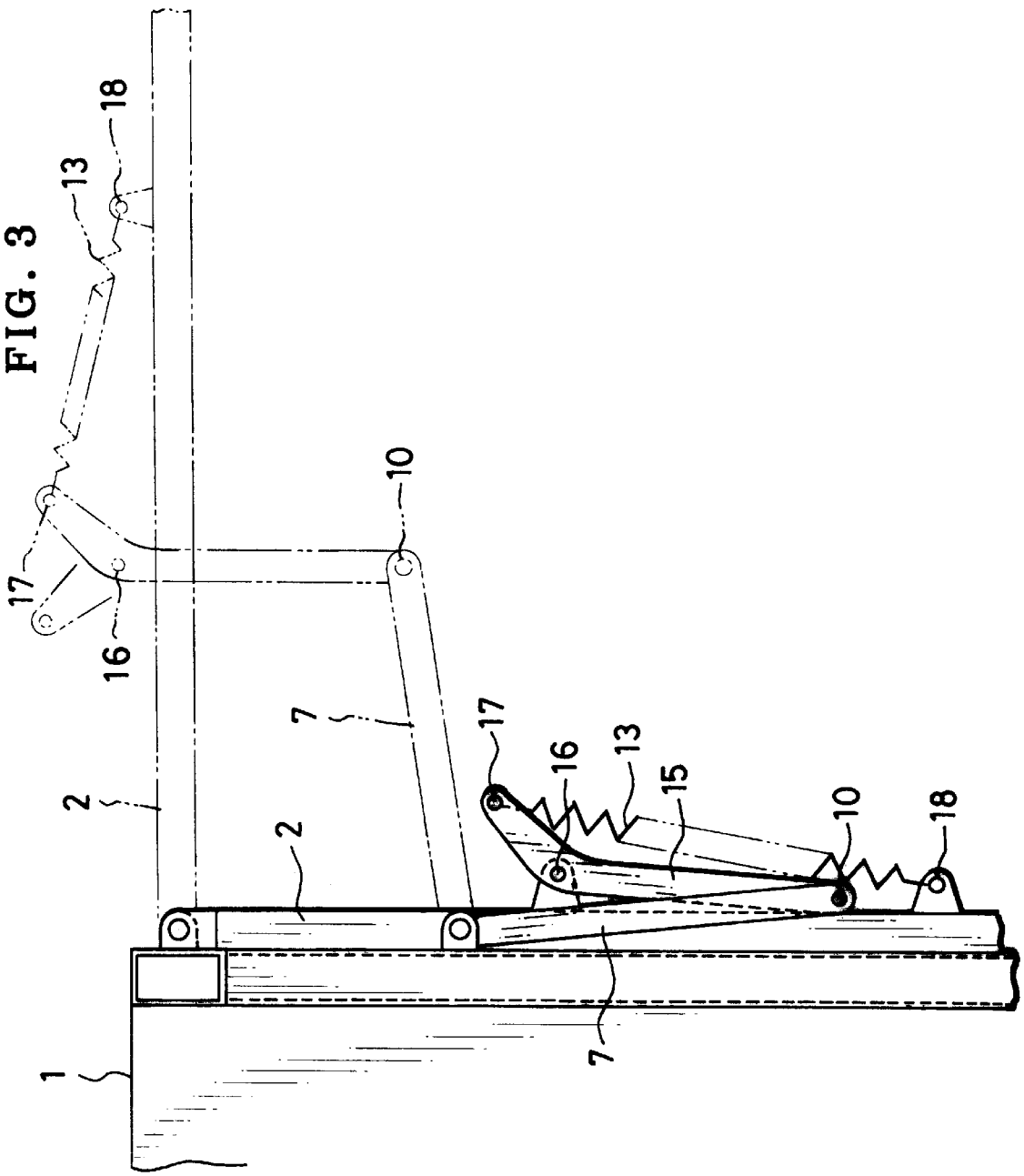
FIG. 3 is a side view illustrating a third embodiment of the present invention.

Embodiments of the present invention will now be described with reference to the drawings.

Embodiment 1

FIG. 1 [in which (A) is a side view and (B) a front view] illustrates a first embodiment of the present invention. In FIG. 1, one end of an arm A 7 is pivotally attached to a main body 1a of a cargo box 1 via a pin 6 so as to be free to turn. One end of an arm B 9 is pivotally attached to a rear door via a pin 8 so as to be free to turn. The other ends of the arm A and arm B are pivotally attached to each other by a pin 10 so as to be free to turn.

A pin 11 is secured to the intermediate portion of the arm B, and a pin 12 is secured to the rear door 2. A tension spring 13 is loaded between the pin 11 and the pin 12. A state in which the rear door has been opened through an angle of 90] is indicated by the two-dot chain line in (A) of the Figure. The distance between the pin 11 and the pin 12 decreases momentarily as the rear door is opened. However, the tensile force of the tension spring acts upon the rear door via the pins 11, 8, whereby the moment due to the rear door's own weight when the rear door 2 is opened and closed is supported. By appropriately selecting the positions of the pins 11 and 12 and the tension of the tension spring 13, the moment due to the rear door's own weight when the rear door of the cargo box is fully open can be supported by the force of the spring in substantially precise fashion, and the rear door of the cargo box can be opened and closed easily by human power. This is as set forth above.

Embodiment 2

FIG. 2 [in which (A) is a side view and (B) a front view] illustrates a second embodiment of the present invention. In the case of this embodiment shown in FIG. 2, the tension spring 13 is loaded between the pin 11 and a pin 14, which is secured to a main body 1a of the cargo box. Other structural elements are similar to those of the first embodiment. The rear door of the cargo box can be opened and closed easily by human power. In this point also this embodiment is similar to the first embodiment.

Embodiment 3

FIG. 3 (only a side view is shown) is a diagram illustrating a third embodiment of the present invention. In the case of this embodiment shown in FIG. 3, an arm B 15 is curved at a point along its length and the arm is pivotally attached to the rear door 2 at this curved portion via a pin 16 so as to be free to turn. A pin 17 is secured to one end of the arm (the end opposite that at which the arm is pivotally attached to the arm A).

A pin 18 is secured separately to the rear door 2, and the tension spring 13 is loaded between the pin 17 and the pin 18. Other structural elements are similar to those of the first embodiment. The rear door of the cargo box can be opened and closed easily by human power. In this point also this embodiment is similar to the first embodiment.

Embodiment 4

Figure 4:
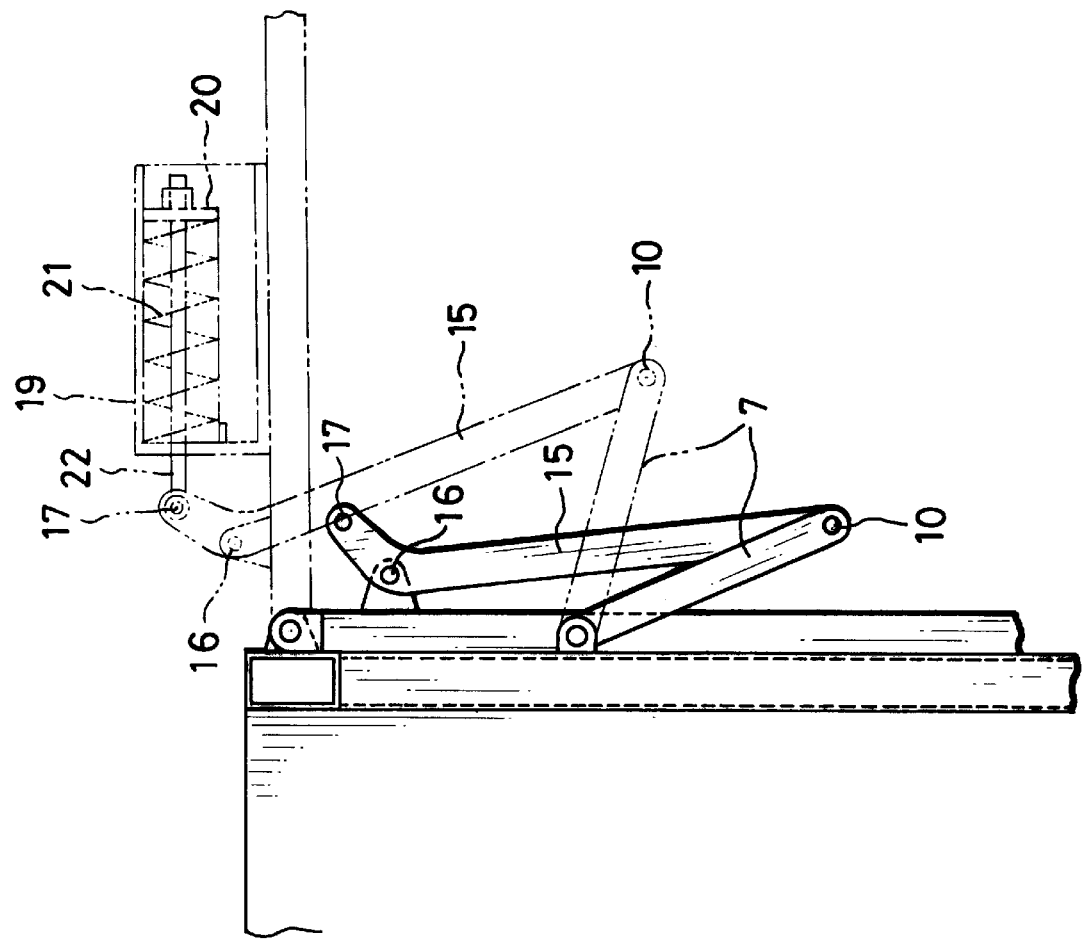
FIG. 4 is a side view illustrating a fourth embodiment of the present invention.

FIG. 4 (only a side view is shown) is a diagram illustrating a fourth embodiment of the present invention. In the case of this embodiment shown in FIG. 4, a spring-supporting member 19 is secured to the rear door 2 and a compression spring 21 is loaded between the member 19 and a spring retainer 20.

More specifically, one end of a shaft 22 is pivotally attached to the pin 17, which is secured to the arm B 15, and the spring retainer 20 is attached to the other end of the shaft 22. In the case of this embodiment, the moment due to the rear door's own weight is supported by the compression spring 21. Other structural elements are similar to those of the third embodiment. The rear door of the cargo box in both the fourth embodiment and the above-described third embodiment can be opened and closed easily by human power. In this point also this embodiment is similar to the first embodiment.

Embodiment 5

Figure 5:
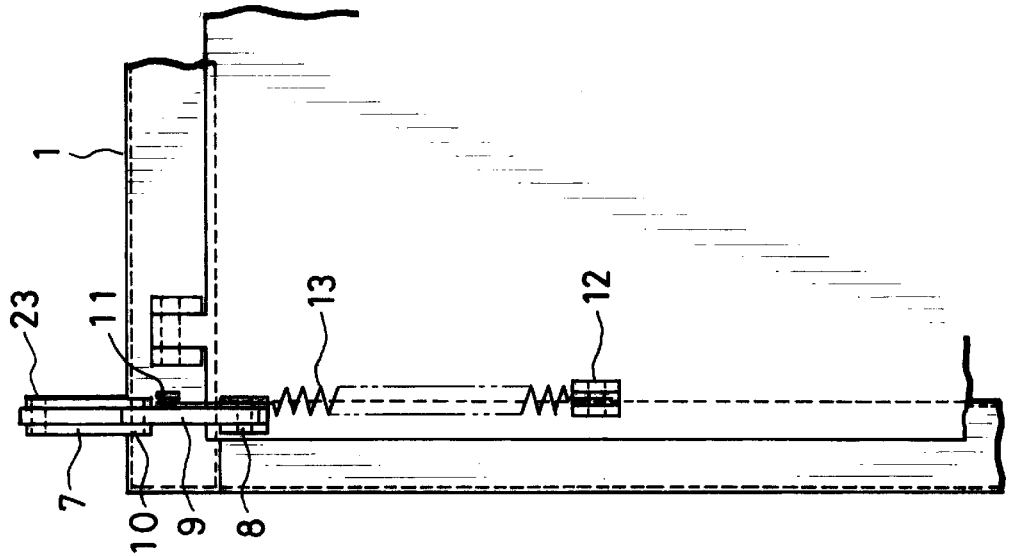
FIG. 5 illustrates a fifth embodiment of the present invention, in which (A) is a side view and (B) a side view.
Figure 5:
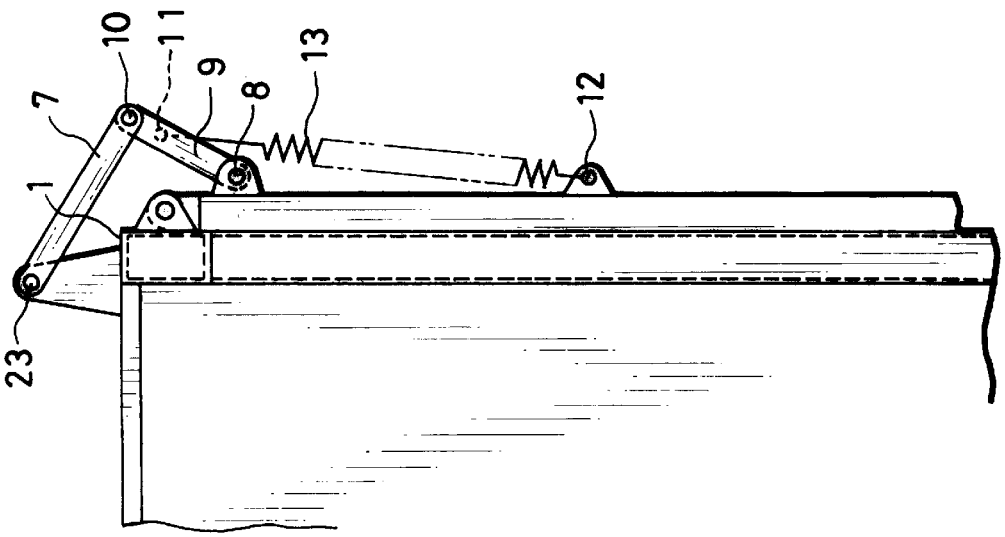

FIG. 5 illustrates a fifth embodiment of the present invention, and FIG. 6 illustrates a rear door in the opened state in this embodiment [in which (A) is a side view and (B) a front view in both Figures]. In the case of this embodiment in both Figures, the arm A 7 is pivotally attached via a pin 23 to an end portion, on the upper side of the cargo box, in the proximity of the rear door 2 of the cargo box. One end of the arm B 9 is pivotally attached via pin 8 to a point in the vicinity of the upper portion of the rear door 2 of the cargo box. The other ends of the arm A 7 and the arm B 9 are pivotally attached to each other via the pin 10. Furthermore, the pin 11 is secured to the intermediate portion of the arm B 9, and the tension spring 13 is loaded between the pin 11 and the pin 12 secured to the outer side of the rear door 2 of the cargo box.

In the case of this embodiment, the rear door of the cargo box can be opened and closed easily by human power. In this point also this embodiment is similar to each of the foregoing embodiments. As is evident from reference to FIG. 6, each of the component parts of the suspension apparatus is located above the rear door 2 of the cargo box when cargo is loaded and unloaded. As a result, there is no danger of these parts being damaged by the cargo.

Embodiment 6

FIG. 7 illustrates a sixth embodiment of the present invention, and FIG. 8 illustrates a rear door in the opened state in this embodiment [in which (A) is a side view and (B) a front view in both Figures]. In the case of this embodiment in both Figures, the arm A 7 is pivotally attached via a pin 23 to an end portion, on the upper side of the cargo box 1, in the proximity of the rear door 2 of the cargo box in a manner similar to that of the fifth embodiment. Further, provided at a point in the vicinity of the upper portion of the rear door 2 of the cargo box is a member 24 that is pivotally attached to the upper portion of the cargo box 1 via a shaft (24a) and secured to the rear door 2 of the cargo box. One end of the arm B is pivotally attached to this member via a pin 25. Furthermore, the other ends of the arm A and the arm B are pivotally attached to each other via the pin 26. The tension spring 13 is loaded between the pin 26 and a pin 27, which is secured to the upper side of the cargo box.

In the case of this embodiment also the rear door 2 of the cargo box can be opened and closed easily by human power. In addition, there is no danger that the component parts will be damaged by the cargo. This feature is similar to that of the fifth embodiment.

Seventh Embodiment

Figure 9:
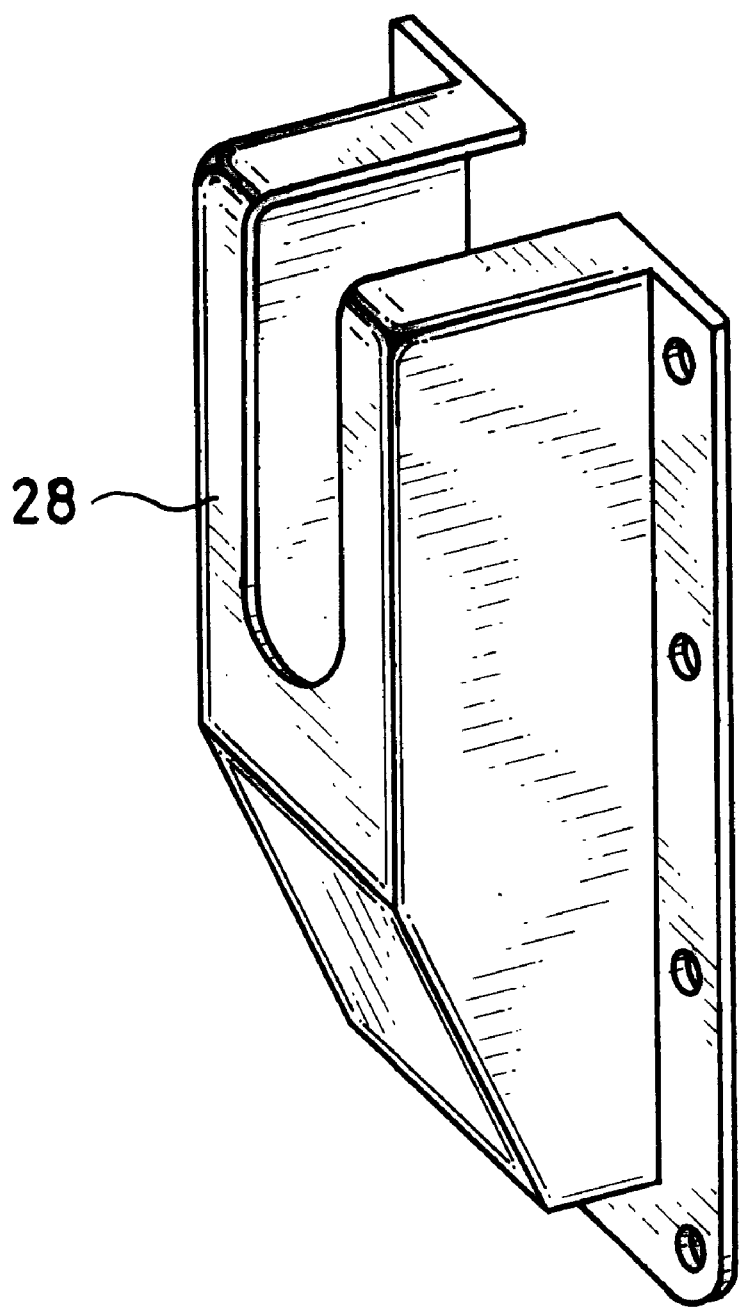
FIG. 9 is a diagram showing a principal portion of a seventh embodiment of the present invention.

FIG. 9 is a diagram illustrating a principal portion of the seventh embodiment of the invention. In the case of this embodiment, a cover 28 illustrated in the Figure is attached to the rear door 2 of the fifth embodiment (see FIGS. 5 and 6) to cover and protect the tension spring 13. Further, the cover is attached to the upper portion of the cargo box 1 of the sixth embodiment (see FIG. 8) to similarly protect the tension spring 13. More specifically, the spring-protecting cover 28 has a hollow space and an opening that accommodate the tension spring 13 and allow expansion and contraction of the tension spring 13 as well as turning of the tension spring 13 about one end thereof as a fulcrum. Furthermore, the periphery of the cover 28 is provided with attaching holes via which the cover 28 is attached to the rear door 2 and cargo box 1.

Eighth Embodiment

Figure 10:
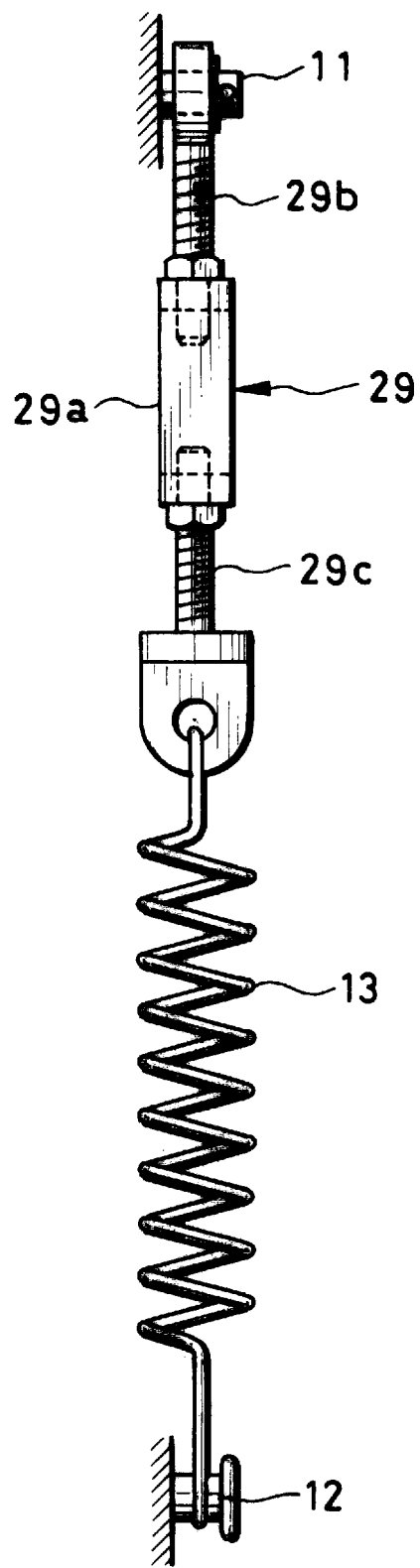
FIG. 10 is a diagram showing only a principal portion of an eighth embodiment of the present invention, in which (A) is a front view and (B) a side view.
Figure 10:
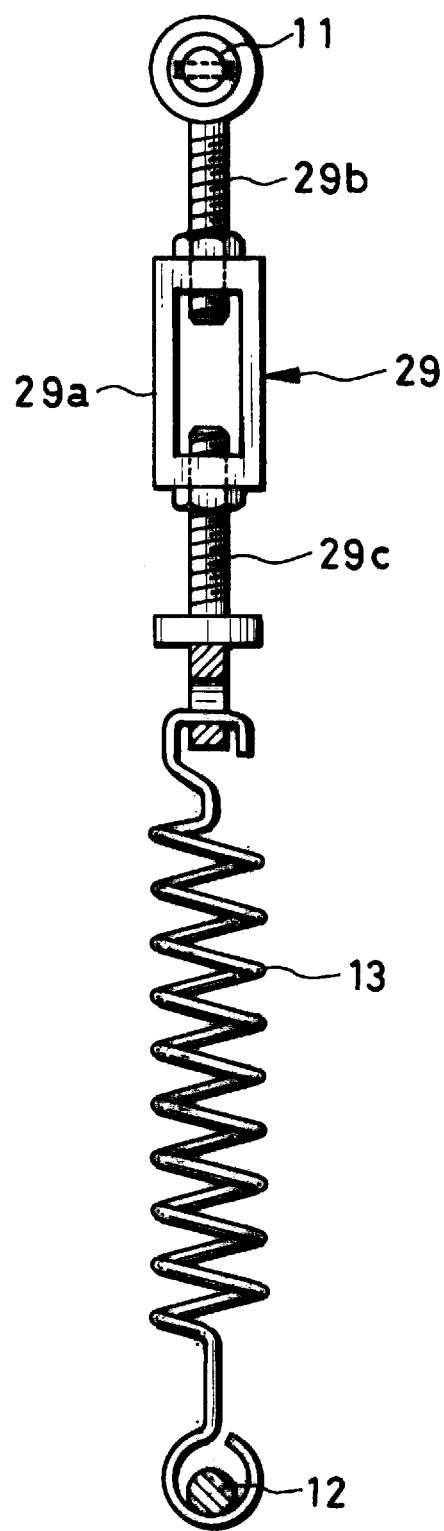

FIG. 10 [in which (A) is a front view and (B) a side view] illustrates only a principal portion of an eighth embodiment of the invention. In this embodiment, the tension spring 13 employed in the first through third embodiments is provided with a turnbuckle 29 (this Figure illustrates a case in which the turnbuckle is used with the first embodiment). For example, in the first embodiment, one end of the turnbuckle 29 is fastened to the arm B 9 via the pin 11, and the other end is connected to one end of the tension spring 13. A pair of screws, namely a left-handed screw 29b and a right-handed screw 29c, are attached to respective ends of an adjusting ring 29a of the turnbuckle 29. Turning the adjusting ring 29a changes the overall length of the turnbuckle 29, thus making it possible to adjust the tension of the tension spring 13. It goes without saying that the turnbuckle 29 can be used effectively in the fifth through eighth embodiments as well.

It is obvious that each of the embodiments illustrated above can be applied as a matter of course to an integral rear door 2 described in FIG. 13, to an upper door 2a (of separating-type doors) described in FIG. 1 2 and to various other vehicles and transport devices having cargo boxes.

Ninth Embodiment

Figure 11:
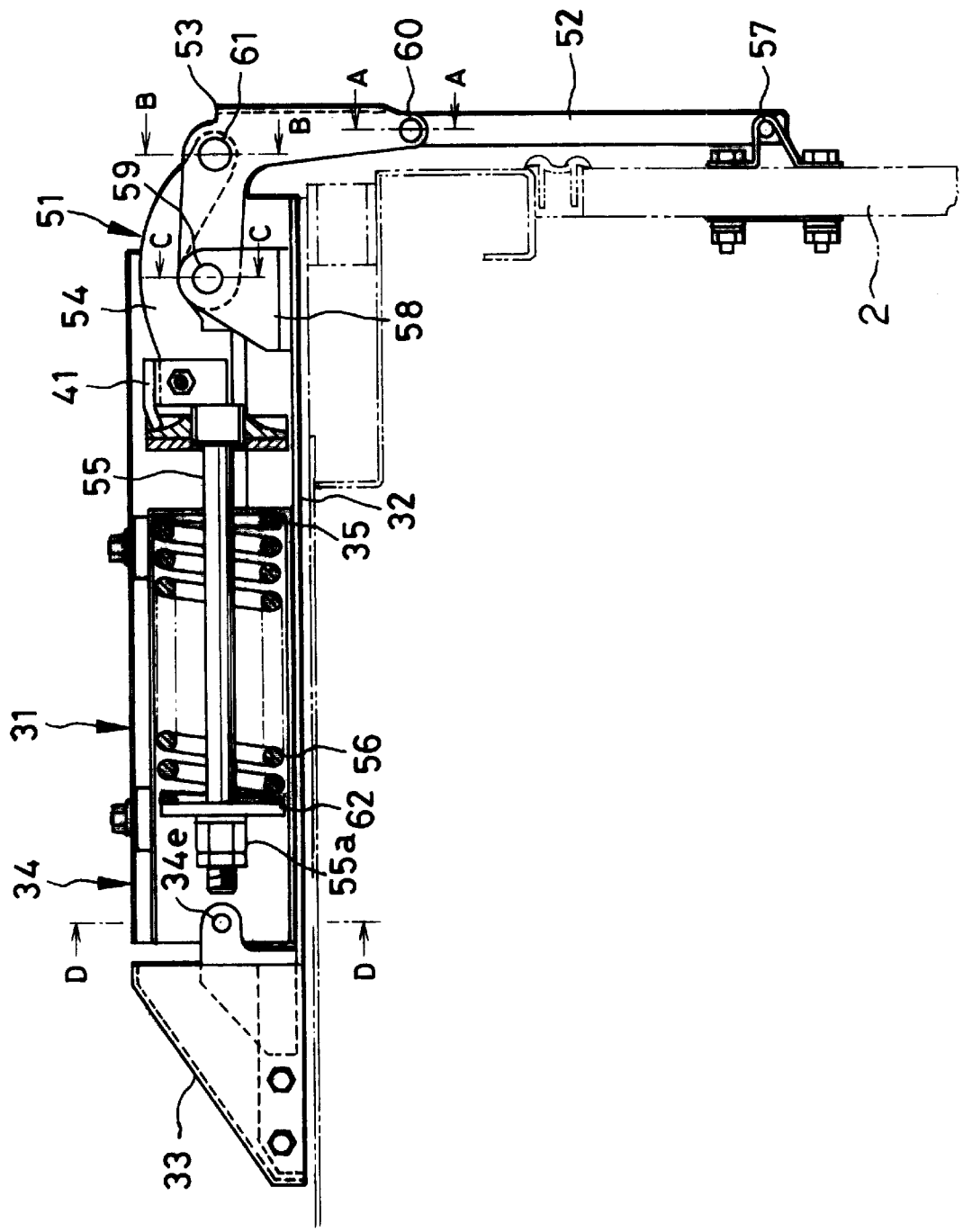
FIG. 11 is a front view illustrating a ninth embodiment of the present invention.

FIG. 11 is a front view exemplifying a cover mounting structure and a door-opening adjusting method in a suspension apparatus for the rear door of a van-type truck according to a ninth embodiment of the present invention. FIG. 12(A) is a right side view of FIG. 11, (B) an enlarged view taken along a cross section D—D in FIG. 11, (C) an enlarged view taken along a cross section A—A in FIG. 11, (D) an enlarged view taken along a cross section B—B in FIG. 11 and (E) an enlarged view taken along a cross section C—C in FIG. 11. Further, FIG. 13(A) is a diagram showing a rear door of the suspension apparatus for the rear door of a van-type truck held suspended at approximately 90], (B) an enlarged view taken along a cross section E—E in (A) and (C) an enlarged view taken along a cross section F—F in (A).

In FIGS. 11–14, the suspension apparatus for the rear door 2 of the van-type truck comprises an arm A 52, an arm B 53, a rod 54, a shaft 55, a compression spring 56, a spring cover mounting structure 31 and a door-opening adjustment mechanism 41.

One end of the arm A 52 is pivotally attached to the outer side of the rear door 2 via a pin 57. The arm B 53 is pivotally attached via a pin 59 to a fitting 58 attached to a base plate 32 secured to the roof of the cargo box 1. The other ends of the arm A 52 and arm B 53 are pivotally attached to each other via a pin 60.

One end of the rod 54 is pivotally attached to the mid-portion of the arm B 53 via pin 61, and one end of the shaft 55 is attached to the other end of the rod 54 via the door-opening adjustment mechanism 41. The rod 54 and the shaft 55 are formed as a single, unitary body.

The spring cover mounting structure 31 is attached to the roof of the cargo box 1 of the truck near the rear end thereof. The spring cover mounting structure comprises the base plate 32, which is fixed to the roof of the cargo box by bolts or the like, a fixture 33 secured to the front portion of the base plate, and a cover assembly 34 having a main-body cover 34a and a spring cover 34b.

The base plate 32 is channel-shaped and is secured to the roof of the cargo box by bolts 35 in the vicinity of the rear portion of the cargo box 1. The roof of the cargo box generally is double-walled, in the manner illustrated, within the range indicated by the symbol "*" in FIG. 13(A). If the base plate is attached within this range, therefore, there is no danger that rainwater will leak from the bolt holes.

The fixture 33 is secured to the base plate 32 at the end portion thereof on the side facing the center of the cargo box. The main-body cover 34a is channel-shaped and the cylindrically-shaped spring cover 34b is inserted into the main-body cover. The cover assembly 34 is formed by joining these two covers together by a connecting member 34c and bolts 34d. One end portion of the cover assembly 34 is pivotally attached to the end portion of the fixture 33 via a pin 34e, and the cover assembly can be rotated up and down about the pin 34e [see FIG. 12(B)].

The shaft 55 is inserted into the spring cover 34b. A spring retainer 62 is attached to the other end of the shaft (the end opposite the side on which the shaft is attached to the rod 54) by a nut 55a, and a spring retainer 35 is attached to the end of the shaft on the side opposite the spring cover 34b (the side opposite the end pivotally attached to the fixture). The compression spring 56 is loaded between both spring retainers 62 and 35.

FIG. 14(A) is a detailed enlarged view of a portion indicated by an arrow Q in FIG. 13, (B) a bottom view thereof and (C) a right side view. In FIGS. 14(A)–(C), the door-opening adjustment mechanism 41 comprises the rod 54, a bracket 42 fitted between the rod and the shaft 55, and an adjustment disk 43. FIG. 14(D) is a diagram illustrating the bracket 42, and (E) is a diagram illustrating the adjustment disk 43.

Figure 14:
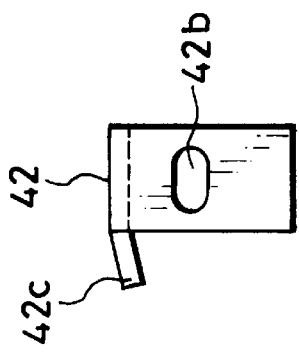
FIG. 14 is a diagram showing a door-opening adjustment mechanism according to the ninth embodiment of the present invention, in which (A) is a detailed enlarged view of a portion indicated by an arrow Q in FIG. 13, (B) a bottom view thereof, (C) a right side view, (D) a diagram showing a bracket and (E) an adjustment disk.
Figure 14:
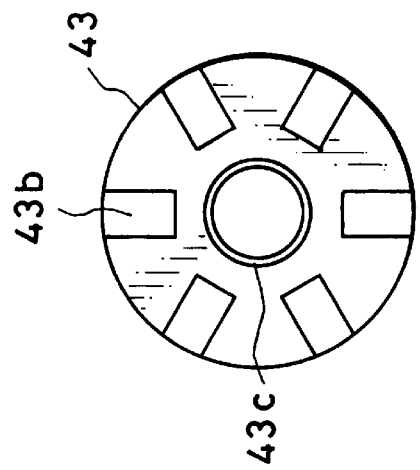
Figure 14:
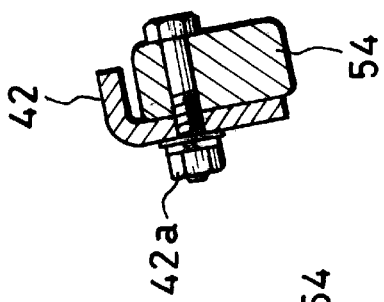
Figure 14:
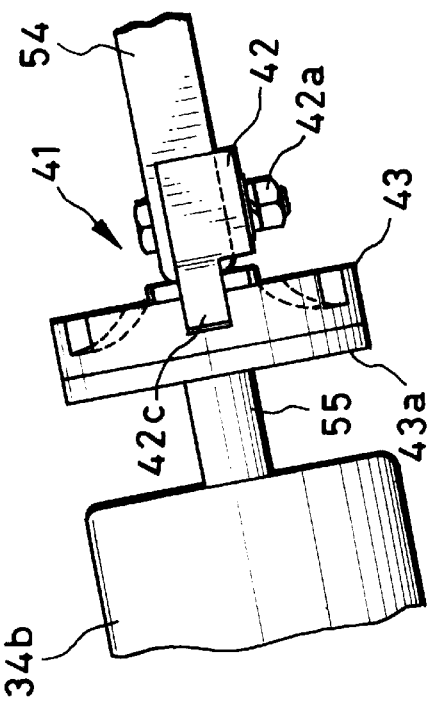
Figure 14:
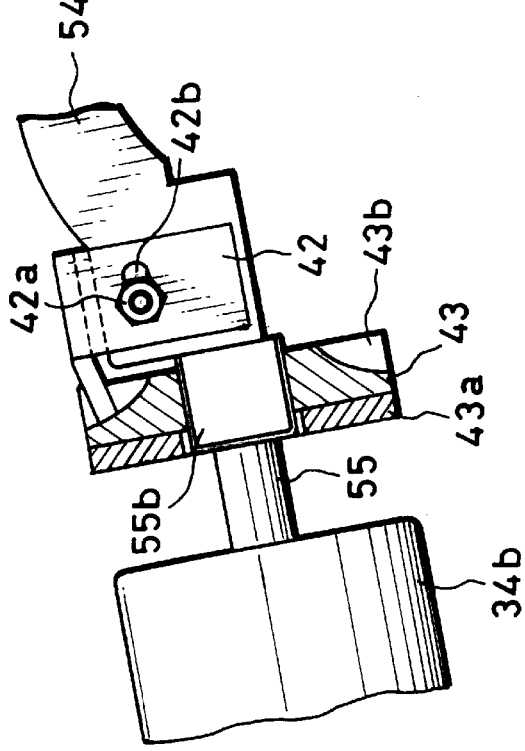
Figure 15:
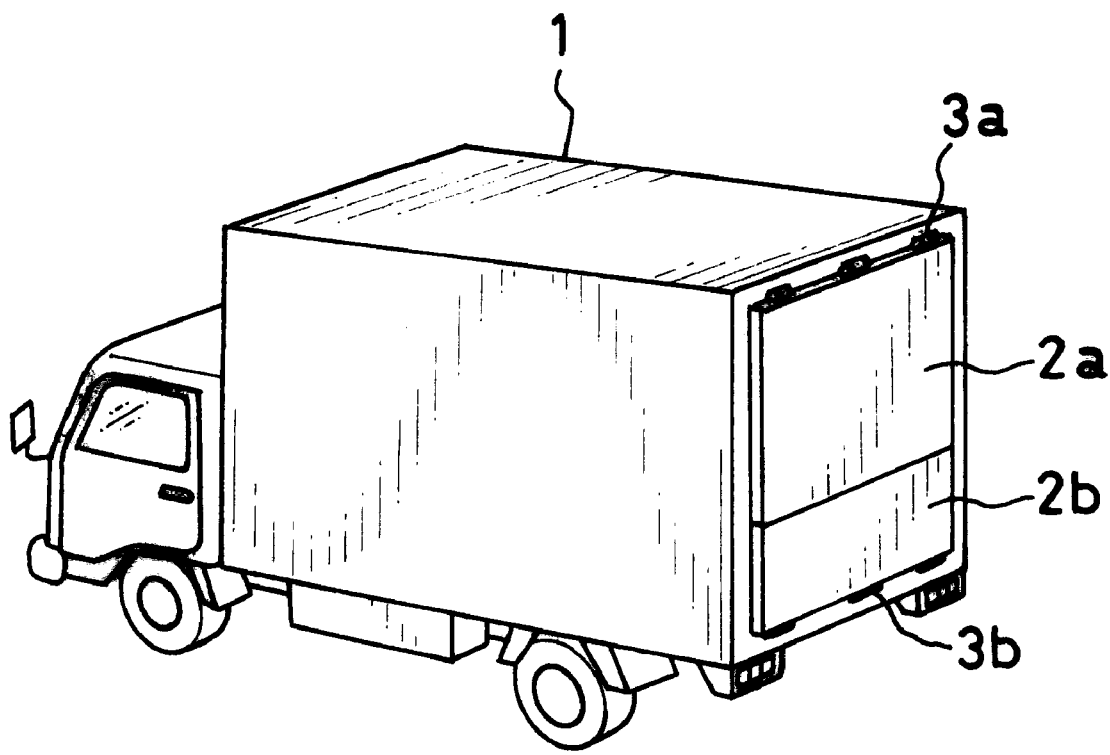
FIG. 15 is a diagram showing a van-type truck.
Figure 16:
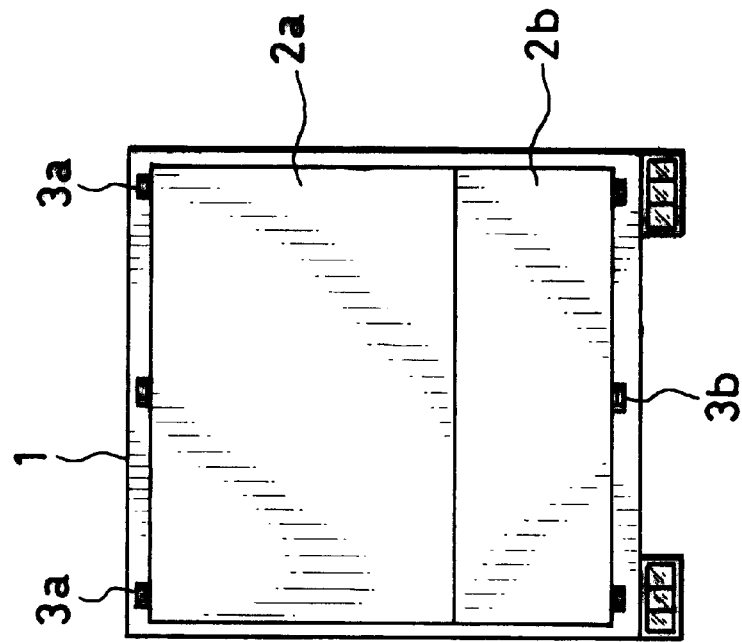
FIG. 16 illustrates the rear door of the van-type truck, in which (A) is a side view and (B) a front view.
Figure 16:
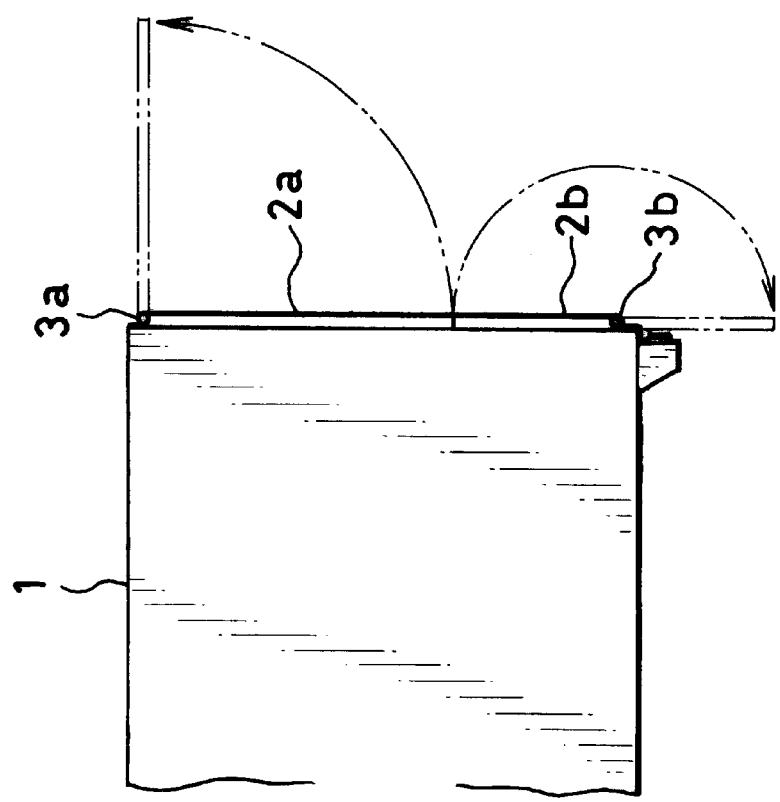

In (A)–(E) of FIG. 14, the bracket 42 comprises a plate having an L-shaped cross section. One face of the bracket is provided with an elongated through-hole 42b. By passing a bolt 42a through the elongated hole 42b and a hole provided in the rod 54 and then tightening the bolt, the bracket 42 and rod 54 are secured in such a manner that their mutual positions can be changed. The other face of the bracket 42 is provided with a finger 42c.

The adjustment disk 43 is disk-shaped and has a shock absorber 43a formed on one surface thereof. The other surface of the disk is provided with a plurality (six in the illustration) of radiating grooves 43b. The center of the adjustment disk 43 is machined to have a threaded hole 43c. Female threads 55b provided on the end portion of the shaft 55 are threadedly engaged with the screw hole 43c, and the finger 42 of the bracket is engaged with a groove 43b.

The operation of the cover mounting structure and door-opening adjustment mechanism in the suspension apparatus for the rear door of the van-type truck according to Embodiment 9 of this invention will now be described on the basis of FIGS. 11–14. First, if the rear door 2 is opened manually starting from the state shown in FIG. 11, the end portion of the rod 54 connected to the door-opening adjustment mechanism 41 attains the state of FIG. 13 while moving upward or leftward in FIG. 11 in conformity with the action of the arms A 52 and B 53. In the meantime, the cover assembly 34 rotates about the pin 34e and, hence, an excessive force does not act upon the shaft 55.

Further, the shaft 55 moves leftward in FIG. 11 (FIG. 13). As a result, the energy that has accumulated in the compression spring 56 decreases and acts as a force to open the rear door 2. This makes it possible to open the door easily. Conversely, in a case where the opened rear door 2 is to be closed, the door can be closed easily without supporting the weight of the door.

If the potential energy at the fully-closed position of the door and the energy lost by the compression spring 56 (the potential energy that has been lost and the energy that has newly accumulated in the compression spring) perfectly coincide at all degrees of opening of the rear door 2, the door can be opened and closed by a force which just overcomes the frictional force of each portion that moves. In addition, the door can be brought to rest at all degrees of opening.

Further, there are many users who require that the door be stopped at any prescribed angle. This requirement is satisfied by the door-opening adjustment mechanism 41. In order to make an adjusting using this mechanism, it will suffice to rotate the adjustment disk 43 to adjust the relative positions of the shaft 55 and adjustment disk 43, then mate the finger 42c of the bracket with the groove 43b and adjust the relative positions of the bracket 42 and rod 54 by the elongated hole 42b and bolt 42a. By thus adjusting the position at which the adjustment disk 43 threadedly engages the shaft 55 an the position at which the bracket 42 is attached to the rod 54, the clearance between the end face of the spring cover 34b and the shock absorber 43a is regulated [see FIG. 14(A)] and the stroke of the shaft 55 in the axial direction, as well as the stroke of the rod 54 (the amount of possible movement of the shaft 55 in the axial direction), is decided. As a result, the amounts by which the rod 54, arm B 13 and arm A 12 are capable of turning are decided, with the end result being that the degree of opening of the rear door 2 to which the arm A 12 is attached is decided. Thus, the maximum degree to which the rear door 2 opens can be decided as well.

The initial amount of compression of the compression spring 56 can be adjusted by a nut 15a. This initial amount of compression is adjusted in such a manner that the compression spring 56 will always be compressed and so that the rear door 2 will be supported at any position by the elastic force of the spring.

Adjusting the door-opening adjustment mechanism 41 in such a manner that the above-mentioned potential energy and elastic energy are made to perfectly coincide is easy. As a result, it is easy to stop the rear door at all degrees of opening.

Furthermore, in accordance with this embodiment, the following effects are obtained by attaching the cover mounting structure and the door-opening adjustment mechanism to the suspension apparatus for the rear door of a van-type truck:

(1) The rear door can be stopped at a prescribed position.

(2) An excessive force does not act upon the compression spring.

(3) The springs and the like are situated on the roof of the cargo box and therefore do not interfere with activities.

(4) Rainwater can be prevented from leaking from the roof.

In the embodiments of the invention, examples are described in which the door suspension apparatus is applied to the rear door of a van-type truck. However, it is obvious that the invention is not limited to the rear door of a van-type truck but can of course be ideally applied to other suspended-type doors and other types of doors.

The present invention is not limited to the foregoing embodiments and can be subjected to obvious changes by one skilled in the art based upon the fundamental idea and principle of the invention deduced from the full disclosure of the invention. Furthermore, the originally filed patent claims of this invention can be likewise be changed, modified or, if necessary, divided based upon the full disclosure.

DESCRIPTION OF SYMBOLS

1 . . . cargo box
2 . . . rear door
2a . . . upper door
2b . . . lower door
3 . . . shaft
3a . . . upper shaft
3b . . . lower shaft
4 . . . air damper
4a . . . cylinder
4b . . . shaft sealing portion
5 . . . cargo box
6 . . . pin
7 . . . arm A
8 . . . pin
9 . . . arm B
10 . . . pin
31 . . . spring cover mounting structure
32 . . . base plate
33 . . . fixture
34 . . . cover assembly
34a . . . main-body cover
34b . . . spring cover
34c . . . connecting member
34d . . . bolt
35 . . . spring retainer
41 . . . door-opening adjustment mechanism
42 . . . bracket
42a . . . bolt
42b . . . elongated hole
43 . . . adjustment disk
43a . . . shock absorber
43b . . . groove
43c . . . screw hole
51 . . . suspension apparatus for rear door of van-type truck
52 . . . .arm A
53 . . . arm B
54 . . . .rod
55 . . . shaft
55a . . . nut
55b . . . female threads
56 . . . compression spring
57 . . . pin
58 . . . fitting
59 . . . pin
60 . . . pin
61 . . . pin
62 . . . spring retainer

What is claimed is:

1. A springing up apparatus for a door of a cargo box of a van-type truck in which the cargo box is formed on an upper portion of a truck bed, comprising:

(a) a first arm (A) having one end pivotally attached to a cargo box body via a pin;

(b) a second arm (B) having a first portion pivotally attached to the door of said cargo box via a pin, and a second portion pivotally attached to another end of said first arm (A) via a pin; and (c) a tension spring loaded between a pin fixed to the door of said cargo box and a pin fixed to a third portion of said second arm (B) in operative association with the door of the cargo box so as to support by expansion and contraction of said tension spring a moment due to empty weight of the door produced as the door of the cargo box is suspended, wherein said first arm (A) and said second arm (B) are disposed outside the cargo box and said apparatus supports the empty weight of the door of said cargo box when the door of said cargo box is suspended fully open and facilitates the springing up of the door of the cargo box by said tension spring.

2. A springing up apparatus for a door of a cargo box of a van-type truck in which the cargo box is formed on an upper portion of a truck bed, comprising:

(a) a first arm (A) having one end pivotally attached to a cargo box body via a pin;

(b) a second arm (B) having a first portion pivotally attached to the door of said cargo box via a pin, and a second portion pivotally attached to another end of said first arm (A) via a pin; and (c) a tension spring loaded between a pin fixed to said cargo box body and a pin fixed to a third portion of said second arm (B) in operative association with the door of the cargo box so as to support by expansion and contraction of said tension spring a moment due to empty weight of the door produced as the door of the cargo box is moved, wherein said first arm (A) and said second arm (B) are disposed outside the cargo box and said apparatus supports the empty weight of the door of said cargo box when the door of said cargo box is suspended fully open and facilitates the springing up of the door of the cargo box by said tension spring.

3. A springing up apparatus for a door of a cargo box of a van-type truck in which the cargo box is formed on an upper portion of a truck bed, comprising:

(a) a first arm (A) having one end pivotally attached to a cargo box body via a pin;

(b) a second arm (B) having a first portion pivotally attached to the door of the cargo box via a pin, and a second portion pivotally attached to another end of the first arm (A) via a pin; and (c) a compression spring loaded between a member fixed to the door of said cargo box and a pin, which is fixed to a third portion of said second arm (B), via a shaft and a spring retainer in operative association with the door of the cargo box so as to support by expansion and contraction of said compression spring a moment due to empty weight of the door produced as the door of the cargo box is moved, wherein said first arm (A) and said second arm (B) are disposed outside the cargo box and said apparatus supports the empty weight of the door of said cargo box when the door of said cargo box is suspended fully open and facilitates the springing up of the door of the cargo box by said compression spring.

4. The springing up apparatus according to claim 1 or 2, wherein the first portion of said second arm (B) is one end thereof, the second portion is the other end thereof and a third portion is an intermediate portion thereof.

5. The springing up apparatus according to claim 1 or 3, wherein the first portion of said second arm (B) is an intermediate portion thereof, the second portion is one end thereof and a third portion is the other end thereof.

6. The springing up apparatus according to claim 1, wherein:

one end of said first arm (A) is pivotally attached to an end portion in the proximity of the door of said cargo box on an upper side of said cargo box, the first portion of said second arm (B) is one end thereof and is pivotally attached to an outer side of the door of said cargo box via the pin, the second portion of said second arm (B) is the other end thereof and is pivotally attached to the other end of said first arm (A) via the pin, the third portion of said second arm (B) is an intermediate portion thereof, and said tension spring is loaded between the pin secured to the third portion of said second arm (B) and the pin secured to the outer side of the door of said cargo box.

7. A springing up apparatus for a door of a cargo box of a van-type truck in which the cargo box is formed on an upper portion of a truck bed, comprising:

(a) a first arm (A) having one end pivotally attached to a cargo box body via a pin;

(b) a second arm (B) having a first portion pivotally attached to the door of said cargo box via a pin, and a second portion pivotally attached to another end of said first arm (A) via a pin; and (c) a tension spring loaded between a pin fixed to said cargo box body and a pin fixed to a third portion of said second arm (B) in operative association with the door of the cargo box so as to support by expansion and contraction of said tension spring a moment due to empty weight of the door produced as the door of the cargo box is moved, wherein:

said first arm (A) and said second arm (B) are disposed outside the cargo box, said apparatus supports an empty weight of the door of said cargo box when the door of said cargo box is suspended fully open and facilitates the springing up of the door of the cargo box by said tension spring, one end of said first arm (A) is pivotally attached to an end portion in the proximity of the door of said cargo box on an upper side of said cargo box, the first portion of said second arm (B) is one end thereof and is pivotally attached to a top portion of the door of said cargo box on an outer side door via the pin, the second portion of said second arm (B) is the other end thereof and is pivotally attached to the other end of said first arm (A) via the pin, the third portion of said second arm (B) is the same as the second portion thereof, and said tension spring is loaded between the pin pivotally attached to the second portion of the second arm (B) and the pin secured to the upper side of said cargo box.

8. The springing up apparatus according to claim 7, wherein the top portion of the door comprises a member, said member is pivotally attached to the cargo box body via a shaft and said first portion of said second arm (B) is pivotally attached to the member.

9. The springing up apparatus according to claim 6 or 7, wherein the upper side of the cargo box body of said cargo box is provided with a cover for protecting said first arm (A) or said tension spring and said first arm (A).

10. The spring up apparatus according to claim 1 or 2, wherein said tension spring is provided with a turnbuckle for adjusting tension.

11. A springing up apparatus for a door of a cargo box comprising:
 (a) a first arm (A) having one end pivotally attached to an outer side of the door of said cargo box;
 (b) a second arm (B) having one end pivotally attached to a roof of the cargo box via a pin, and another end pivotally attached to the other end of said first arm (A) via a pin;
 (c) a rod having one end pivotally attached to an intermediate portion of said second arm (B) via a pin;
 (d) a shaft having one end attached to the other end of said rod and another end to a spring retainer; and
 (e) a compression spring loaded between said spring retainer and a member attached to the roof of said cargo box in operative association with the door of the cargo box so as to support by expansion and contraction of said compression spring a moment due to empty weight of the door produced as the door of the cargo box is moved,
 wherein:
  said apparatus supports an empty weight of the door of said cargo box when the door of said cargo box is suspended fully open and facilitates the springing up of the door of the cargo box by said compression spring, a shaft mounting portion of said rod is provided with a door-opening adjustment mechanism comprising elements (f)–(g), a spring cover mounting structure comprising elements (h)–(j) is provided as a member attached to said roof, a spring axis of said compression spring and the direction of a compressive force are made to coincide to prevent an excessive force from acting upon said compression spring, and said apparatus allows the door of said cargo box to be brought to rest at an appropriate degree of opening,
  wherein elements (f)–(j) are the following:
 (f) a bracket comprising a plate having an L-shaped cross section, the plate having one face provided with an elongated hole and another face formed to have an adjustment finger, the bracket being secured to said rod by a bolt passed through the elongated hole and a hole provided in said rod;
 (g) an adjustment disk having a disk-shaped configuration, one side of the disk having a shock absorber attached thereto, another side of the disk being provided with a plurality of grooves engaged by the adjustment finger of said bracket, and a central portion of the disk being provided with female threads with which the one end of said shaft is threadedly engaged;
 (h) a base plate secured to the roof of said cargo box;
 (i) a fixture secured to said base plate; and
 a cover assembly comprising a channel-shaped main-body cover and a cylindrically-shaped spring cover, which is integrally attached in an interior of said main-body cover from one end of said main-body cover to a point in the proximity of a central portion of said main-body cover, the other end of said shaft being inserted into said spring cover, one end portion of the spring cover being pivotally attached to said fixture via a horizontally provided pin, a spring retainer being attached to the other end and said door-opening adjustment mechanism being housed inside the main-body cover at the other end portion of said main-body cover.

12. A springing up apparatus for a door of a cargo box of a van-type truck comprising:
 (a) a first arm (A) having one end pivotally attached to an outer side of the door of said cargo box, the first arm (A) being capable of turning relative to the door of said cargo box as the door of said cargo box is opened and closed;
 (b) a second arm (B) having one end pivotally attached to a roof of the cargo box, and another end pivotally attached to the other end of said first arm (A), the second arm (B) being capable of turning relative to the roof of said cargo box in dependence upon turning of said first arm (A);
 (c) a rod having one end pivotally attached to an intermediate portion of said second arm (B) via a pin, the rod being capable of turning relative to said second arm (B) and the roof of said cargo box in dependence upon turning of said second arm (B);
 (d) a shaft having one end attached to the other end of said rod, and another end to which a spring retainer is attached, the shaft being movable axially and being capable of turning relative to the roof of said cargo box in dependence upon turning of said rod; and
 (e) a compression spring loaded, substantially in concentric relation to said shaft, between said spring retainer and a member attached to the roof of said cargo box in operative association with the door of the cargo box so as to support by expansion and contraction of said compression spring a moment due to empty weight of the door produced as the door of the cargo box is moved,
 wherein a door-opening adjusting mechanism is further provided between said rod and said shaft, said door-opening mechanism being attached to said shaft so as to be movable axially of said shaft by being operated and having on one side an engagement portion which engages said rod and on the other side a surface which limits the stroke of said shaft in the axial direction thereof, wherein the number of turns of said rod engaged with said shaft adjusts the stroke of said shaft, said second arm (B) and said first arm (A) being limited by the stroke of said shaft, whereby degree of opening of the door of said cargo box is limited so that the door of said cargo box is capable of being brought to rest at any degree of opening; and further wherein
 the member attached to said roof is a cover for receiving said shaft and said compression spring, one side of said compression spring being secured substantially in concentric relation to said shaft, the cover being pivotally attached to a roof side and being capable of turning in dependence upon turning of said rod, the cover turning in unison with the compression spring in dependence upon turning of said rod while the concentric relationship between said shaft and said compression spring is maintained;
 wherein, said door of said cargo box is opened and closed by being rotated about a horizontal axis and by operative association of said elements (a)–(e), an empty weight of the door of the cargo box when the door of said cargo box is suspended fully open and a force caused by rotation of the door of said cargo box about a horizontal axis are supported by said compression spring, which expands and contracts in operative association with rotation of the door of said cargo box, thereby allowing the door of said cargo box to rest at a desired degree of opening.

* * * * *